United States Patent
Hall

(10) Patent No.: US 10,812,430 B2
(45) Date of Patent: Oct. 20, 2020

(54) METHOD AND SYSTEM FOR CREATING A MERCEMOJI

(71) Applicant: MERCURY UNIVERSE LLC, Frisco, TX (US)

(72) Inventor: Mercury Ronnell Hall, Frisco, TX (US)

(73) Assignee: Mercury Universe, LLC, Frisco, TX (US)

( * ) Notice: Subject to any disclaimer, the term of this patent is extended or adjusted under 35 U.S.C. 154(b) by 0 days.

(21) Appl. No.: 16/243,385

(22) Filed: Jan. 9, 2019

(65) Prior Publication Data
US 2019/0260702 A1 Aug. 22, 2019

Related U.S. Application Data

(60) Provisional application No. 62/633,774, filed on Feb. 22, 2018.

(51) Int. Cl.
| | | |
|---|---|---|
| *H04L 12/58* | (2006.01) | |
| *H04L 29/08* | (2006.01) | |
| *H04M 1/725* | (2006.01) | |
| *G06F 3/0481* | (2013.01) | |

(52) U.S. Cl.
CPC .......... *H04L 51/10* (2013.01); *G06F 3/04817* (2013.01); *H04L 51/32* (2013.01); *H04L 67/36* (2013.01); *H04M 1/72544* (2013.01); *H04M 1/72552* (2013.01); *H04M 1/72555* (2013.01)

(58) Field of Classification Search
USPC ........................................................ 709/206
See application file for complete search history.

(56) References Cited

U.S. PATENT DOCUMENTS

| | | | | |
|---|---|---|---|---|
| 2002/0089504 A1* | 7/2002 | Merrick | ................ | G06F 3/0481 345/473 |
| 2004/0068408 A1* | 4/2004 | Qian | ...................... | G10L 21/06 704/270 |
| 2009/0278851 A1* | 11/2009 | Ach | ........................ | G06T 13/40 345/473 |
| 2012/0194523 A1* | 8/2012 | Marggraff | ............... | G06F 3/038 345/473 |
| 2015/0172599 A1 | 6/2015 | Caldwell | | |

(Continued)

FOREIGN PATENT DOCUMENTS

WO 2016144385 A1 9/2016

*Primary Examiner* — Hermon Asres
(74) *Attorney, Agent, or Firm* — Aruna Ghatak-Roy

(57) ABSTRACT

Generating a mercemoji. A method includes: acquiring, by an application executed by a computing system, a computer-readable file including audio captured on a computer-readable file; generating, by the application, audio markers by analyzing the audio captured on the computer-readable file; generating, by the application, animation commands by interpreting the audio markers; creating, by the application, a mercemoji by manipulating controls of an animation asset based on the animation commands in a manger that is synchronized with a playback of the audio file, where a displayed movement of one or more portions of the animation asset is based on the manipulation of the controls of the animation asset; and inputting the mercemoji in a chat program implemented by the application.

19 Claims, 17 Drawing Sheets

(56) References Cited

U.S. PATENT DOCUMENTS

| | | | |
|---|---|---|---|
| 2015/0287403 A1* | 10/2015 | Holzer Zaslansky | G10L 21/10 |
| | | | 704/231 |
| 2016/0261675 A1 | 9/2016 | Block | |
| 2017/0018289 A1 | 1/2017 | Morgenstern | |
| 2017/0140214 A1 | 5/2017 | Matas | |

* cited by examiner

METHOD AND SYSTEM FOR CREATING A MERCEMOJI

CROSS-REFERENCE TO RELATED APPLICATIONS

This application claims the benefit of U.S. Provisional Application Ser. No. 62/633,774 filed Feb. 22, 2018 titled "Multi-media conversion (animated emoji)/(MERCemoji)." The provisional application is incorporated by reference herein as if reproduced in full below.

BACKGROUND

People often use a computing device to express themselves and interact with each other. For example, people may use their computing device to express themselves verbally on a blogpost or visually in a video. People may use their device to chat or talk to one another or access social networking systems. In particular, users can use their computing devices to interact with one another, access and share content, and create content. In the context of chatting, blogging, or some other form of communication that includes visual and auditory components, a user may find they are able to communicate more effectively by including an emoji, emoticon, or avatar in their communications.

BRIEF DESCRIPTION OF THE DRAWINGS

For a detailed description of example embodiments, reference will now be made to the accompanying drawings in which.

DEFINITIONS

Figure 1:
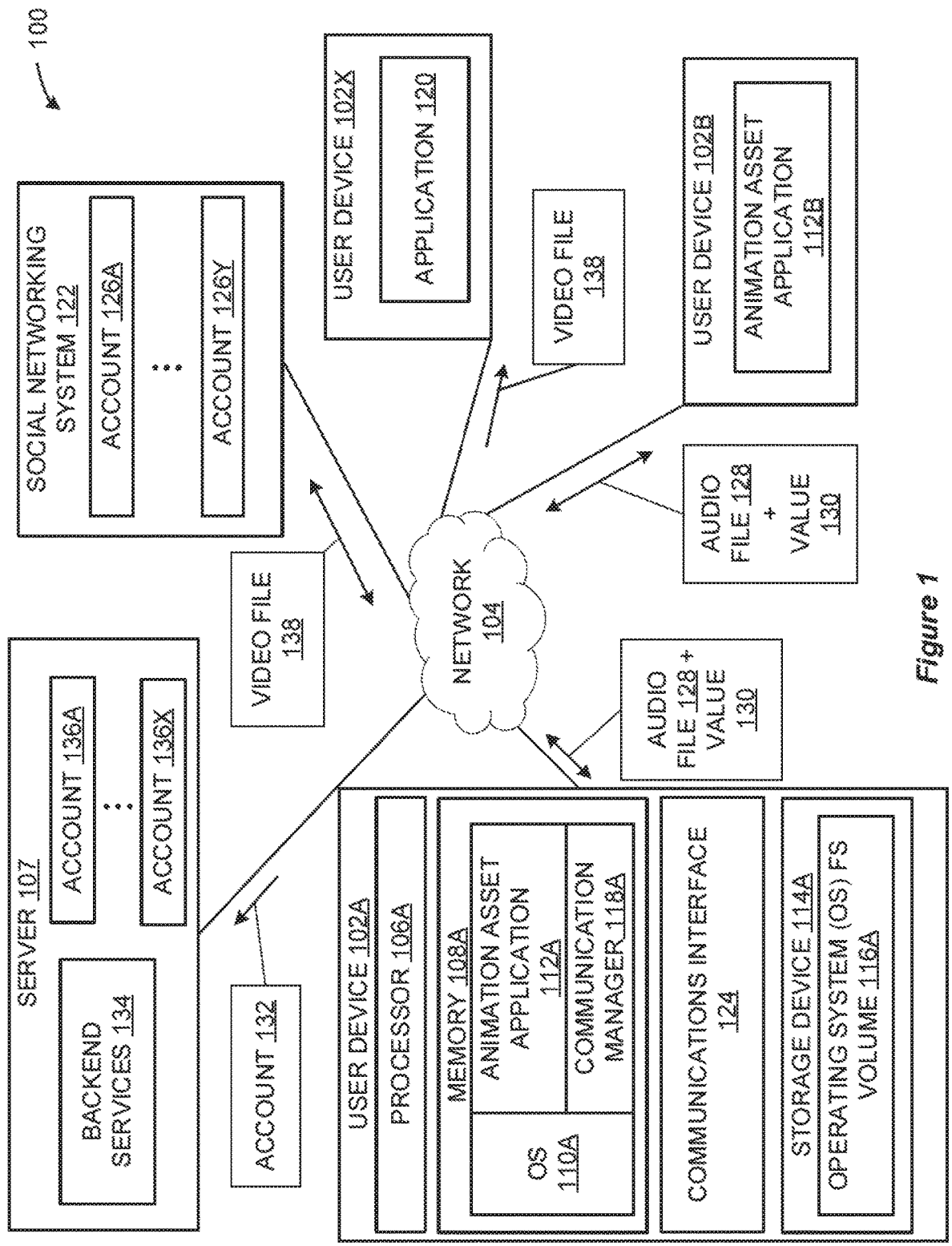
FIG. 1 shows an example system architecture, in accordance with some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Module," shall mean a set of machine-readable instructions that are readable and executed by a processor. The set of machine-readable instructions is stored on a memory. The set of machine-readable instructions contain one or more routines that are executable by the processor.

"Program" or "Software program" or "application" shall mean a set of machine-readable instructions comprising one or more modules that are combined when the program is linked. A program includes components executing on distinct processors.

"Acquiring, by an application executed by a computing system" or "acquire a file" or "receive a file" shall mean that a data is captured using hardware coupled to a processor of a computing system.

An "animation asset" shall mean a computer-generated image or computer graphic, comprising controls that are manipulated to modify a feature of the computer graphic. The computer graphic is represented in a computer readable format, where executable code defines features of the computer graphic including: a geometry, an appearance, a scene, and animations.

A "mercemoji" shall mean an animation asset paired with an input file in such a manner that when the animation asset is activated, the animation asset moves in a choreographed manner synchronous to a playback of the input file. That is, motions of the animation asset are based on content of the input file. A format of the mercemoji is a computer executable file that contains instructions, for a given point in time of the audio file, which portion of the animation asset moves and how the portion of the animation asset moves.

"Providing an animation asset" shall mean providing the computer-executable instructions representing the animation asset, from a location in memory to an application. When a processor of the computer reads the computer-executable instructions representing the animation asset, the computer-executable instructions shall cause the processor to render for display the computer graphic on a display communicatively coupled to the processor.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

At least some of the example embodiments are directed to an animated emoji chat application. More particularly, various example embodiments are directed to methods and systems of sharing a mercemoji within various social networking environments, including a chat environment internal to the chat application. In contrast to emojis that are preprogrammed to move in a certain way that is unalterable, the animation asset used to create the mercemoji is fully customizable. For example, a user can record her voice into a smartphone (e.g., create an input file) and create a mercemoji that appears to speak in her recorded voice. Thus the resulting mercemoji, created from a selected animation asset, is defined by the input file provided by the user. That is, how the mercemoji moves when displayed to a user is defined by the input file. The same animation asset will move in a different way given a different input file.

Additionally, the chat application has the capability of creating the mercemoji in "live-time". That is, the chat application does not require receiving a fully created mercemoji to display the mercemoji to a recipient. Instead, the chat application is capable of re-creating a mercemoji based on a received input file (e.g., the user's recorded voice) and re-creating it fast enough such that is appears to the user that the entire mercemoji was received instead of just the input file. Thus, when a created mercemoji is shared between users of the chat application, a fully created mercemoji is not shared between the users. Instead, an input file (e.g., a user's recorded voice) is shared between the users and the receiving chat application re-creates the mercemoji in live-time so as to give the appearance that the mercemoji was shared between the users. The manner in which the mercemoji is shared varies based on whether the mercemoji is shared internal to the chat application or to a different social networking service.

By sharing a created mercemoji by transmitting simply an input file, and additional periphery data such as a value indicative of the animation asset used to create the mercemoji, less data is transmitted than might otherwise be transmitted between user devices (e.g., less data than if the fully created mercemoji was transmitted). Furthermore, the methods and techniques described herein effect a transformation of an animation asset to a different thing, a mercemoji. More specifically, the methods and techniques described herein, combine the animation asset with an input file provided by the user to effect a transformation of the animation asset to a mercemoji. Overall, in contrast to other emojis that offer preprogrammed motions and appearance, the mercemoji enhances a user experience as she is able to more completely customize an animation asset (e.g., the mercemoji speaks using the user's voice) and as a result more fully express herself to others.

FIG. 1 shows an example system architecture 100 in block diagram form, within which an animated emoji, or mercemoji is created and shared among various users. The example system architecture 100 includes user devices 102, server 107, and a social networking system 122. The example system architecture 100 is not meant to be limiting and other system architectures can be used to share a mercemoji without departing from the scope of this disclosure.

Each of the user devices 102 represents any form of a computing device, e.g., a personal computing device, a smart phone, a tablet, a wearable computing device, a media player device, and a desktop computing device. Each of the example user devices 102 includes a processor, a memory, and a storage. Aspects of the processor, memory, and storage are discussed next, where the following discussion of the user device 102A is equally applicable to each of the user devices 102B and 102X.

In the example user device 102A, the processor 106A is configured to work in conjunction with the memory 108A and the storage device 114 to enable the user device 102A to implement the various methods set forth in this disclosure. According to some embodiments, the storage device 114A is a storage that is accessible to the user device 102A, e.g., a hard disk drive, a solid-state drive, a mass storage device, and a remote storage device. For example, the storage device 114A stores an operating system (OS) file system volume 116A mounted at the user device 102A, where the OS file system volume 116A includes an OS 110A that is compatible with the user device 102A. Examples of the OS 110A include iOS®, Android®, and Windows®.

Continuing the discussion of the example user device 102A, the OS 110A enables the animation asset application 112A to execute on the user device 102A. The OS 110A enables a variety of other processes to execute on the user device 102A, e.g., OS daemons, native OS applications, and user applications. In particular, with the user devices 102A and 102B, respective operating systems enable the animation asset applications 112, configured to create a mercermoji in accordance with methods described herein, and share and receive mercemojis. In contrast, the OS executing within the user device 102X, enables the execution of an application 120, which may also participate with the animation asset application (e.g., receive a mercemoji).

In various embodiments, the application 120 is a social media application configured to display content from a social networking system 122, a browser configured to display content from the animation asset application 112, and the like. The application 120 is different from the animation asset application 112A and 112B, and for reasons described below, the application 120 receives a mercemoji in a format different from a mercemoji received by the animation asset application 112.

Thus, for purposes of this discussion, both the user devices 102A and 102B are executing a version of an animation asset application (e.g., animation asset applications 112A and 112B), while the user device 102X is not shown as executing a version of the animation asset application, but can nevertheless participate. The example, in FIG. 1, is set up in such a manner to illustrate various features of sharing a mercemoji both internal to the animated asset application 112 and external to the animation asset application.

Continuing discussions of the example user device 102A, the OS 110A enables the execution of a communication manager 118A which interfaces with a communications interface 124. The communications interface 124 represents one or more of a variety of communication interfaces that may be included in the user device 102A, such as, a Wi-Fi interface, a Bluetooth interface, a Near Field Communication (NFC) interface, a cellular interface, and an Ethernet interface. The communication manager 118A is software that enables the user device 102A to send and receive data through the network 104, while the communications interface 124 is hardware configured to send and receive the data through the network 104. As mentioned previously, with the exception of specific applications executing on the respective user devices, the above discussions of the example user device 102A apply equally to the user device 102B and 102X.

The social networking system 122 is an online platform that enables users to build social networks with other users. The social networking system 122 is implemented using several computing devices, where each computing device, respectively, includes at least one processor, at least one memory, and at least one storage (e.g., a hard drive, a solid-state storage device, a mass storage device, and a remote storage device). The individual computing devices can be any form of a computing device such as a desktop computing device, a rack-mounted computing device (e.g., cloud computing), and a server device. The foregoing example computing devices are not meant to be limiting. On the contrary, individual computing devices implementing the social networking system 122 can be any form of computing device without departing from the scope of this disclosure.

The social networking system 122 provides services that connects the various users and maintains user accounts 126A-126Y associated with respective user. In one example of a social networking system 122, after logging into an account 126A, the user can access a newsfeed, share content with other user (e.g., pictures, songs, and videos), message other users, plan events with other users, or play games with other users. Additionally, the social networking system 122 can provide content such as movie channels, video channels, music channels, and the like.

For purposes of this discussion, the application 120 executing on the user device 102X is associated with the social networking system 122 and not the animation asset application as associated server 107. In some examples, the application 120 is maintained by the same entity that maintains the social networking system 122. However, in other examples, the application 120 is provided by an entity different from the entity that maintains the social networking system 122. In either scenario, the application 120 is programmed such that it is compatible both with the operating system of the user device 102X as well as the social networking system 122. The application 120 may be provided by the social networking system 122 to enable a user to view content provided by the social networking system 122 in a user friendly format. Thus, the application 120 provides a graphical user interface (GUI) for a user of the user device 102X to access the social network and content provided by the social networking system 122.

The server 107 includes one or more computing devices, where each computing device, respectively, includes at least one processor, at least one memory, and at least one storage (e.g., a hard drive, a solid-state storage device, a mass storage device, and a remote storage device). The individual computing devices can be any form of a computing device e.g., a desktop computing device, a rack-mounted computing device, and a server device. The foregoing example computing devices are not meant to be limiting. On the contrary, individual computing devices implementing the server 107 can represent any form of computing device without departing from the scope of this disclosure.

In some embodiments, the server 107 is maintained by an entity that also provides the animation asset application 112. The server 107 maintains various backend services 134 associated with the animation asset application 112. For example, the backend services 134 can provide updates to the animation asset applications 112. The backend services 134 can also manage a complete library of animation assets. Additionally, the server 107 maintains accounts 136 of users using the animation asset application 112. In some embodiments, the server 107 maintains a lookup table associated various accounts 136 with respective devices. Thus, when the server 107 receives data destined for a specific account (e.g., account 136A), the server 107 looks up the user device associated with the account 136A and transmits the data to the device.

The user devices 102, the server 107, and the social networking system 122 are communicatively coupled by a network 104. The network 104 can include a local area network (LAN), a wide area network (WAN), and additionally, wired technologies (e.g., Ethernet®) and wireless technologies (e.g., Wi-Fi®, code division multiple access (CDMA), global system for mobile (GSM), universal mobile telephone service (UMTS), Bluetooth®, and ZigBee®).

Still referring to FIG. 1, through methods described herein, the example animation asset application 112A is configured to create a mercemoji and share the mercemoji with other user devices. Initially a mercemoji begins as an animation asset. The animation asset application 112A provides various animation assets to a user that are configurable by the user. The user can select a particular animation asset and modify the appearance of the animation asset.

In addition to selecting the animation asset, the user also provides an input file. The animation asset application 112A is configured to modify movements of the selected animation asset based on the input file. In one example, the animation asset represents a 3-D model of an emoji (3-D emoji) comprising controls. The controls enable the animation asset application 112A to modify motions of the 3-D emoji over a time continuum.

In particular, the animation asset application 112A creates a mercemoji by choreographing motions of the 3-D emoji (e.g., by programming animation commands or control signals to manipulate the controls) such that motions of the 3-D emoji are synchronized with an input file. An input file can take any form that is readable by the user device 102A and can include audio, video, pictures, or a combination thereof. Furthermore, sources of an input file can vary. The input file can be prerecorded and come from a video, movie, or song. Additionally, the input file can be generated from a user speaking into a microphone of the user device 102A.

For purposes of the discussion herein, an example input file is an audio file. The audio file may come from the audio portion of a video file, sound recorded using a microphone (e.g., the microphone of the user device, a microphone communicatively coupled to a computing device), or an audio file itself. Furthermore, the original file providing the audio can be further edited before being provided as the input file. For example, a user may choose to use a bridge of a recorded song for his mercemoji. The user can crop the original song such that the input file include only the bridge and provide that as the input file. Thus, a user can edit and adjust a particular computer-readable file to create the input file.

Examples of an aspect of the audio file that may be used to define motions of the animation asset include, words spoken or sung in the audio file, a tone captured in the audio file, a volume of sound captured in the audio file, a pitch of sound captured in the audio file, or combinations thereof. Thus, the motions of the animation asset are controlled by some aspect of the input file. Although the above example uses an audio file, other types of media can be used without departing from the scope of this disclosure, such as a video file or a set of pictures, for example.

The choreographed motions can include motion of a feature of the 3-D emoji including facial features, body parts, and other items associated with the 3-D emoji. For example, lip movements of the 3-D emoji can be manipulated to generate the appearance of the 3-D emoji speaking or singing the words of a song. Additional motions also include, the head of the 3-D emoji moving, arms or other body parts rocking to a beat of a song, arms or other body parts gesturing (e.g., throwing a peace sign or a first pump), or other motions that are dictated by some aspect of an audio file.

In various embodiments, the animation asset application 112A synchronizes the 3-D emoji with a received input file in "live-time". In one example, for a given selected animation asset, the animation asset application 112A parses the input file to create audio markers, defines control signals based on the audio markers, and then applies the control signals and display the 3-D emoji synchronous to playing back the audio file. The use of "live-time", herein references the idea that each time the input file is received, the animation asset application performs the steps of parsing the input file to create audio markers, defining control signals based on the audio markers, and applying the control signals to the animation asset. The animation asset application creates the mercemoji using the input file in a manner that gives the appearance as if the animation asset application received the fully created mercemoji, instead of just the input file.

In some embodiments, the animation asset application 112A only needs an input file and an indication of a selected animation asset to create the mercemoji in live-time. In various embodiments, the animation asset application 112 comes with a predefined set of animation assets, where each animation asset is associated with a corresponding value indicative of the animation asset. Each of the animation assets comes with a predefined set of controls, where the controls respond to control signals. Additionally, a user can customize the look of an animation asset.

In some embodiments, when a customized animation asset is created, the customized animation asset is shared with the server 107, and stored in a library of animation assets maintained by the server 107. When an animation asset application 112 receives a value indicative of an animation asset, the animation asset application 112 searches a local library (e.g., stored within the animation asset application 112) as well as the library of the server 107 to provide the animation asset.

In various embodiments, after a mercemoji is created using the animation asset application 112A, the mercemoji can be shared to various devices. The manner in which the mercemoji is shared depends to whether the mercemoji is shared within the network established by the several animation asset application (e.g., internal communication), or outside of the animation asset application. For example, when a mercemoji, created by the animation asset application 112A, is shared with another animation asset application (e.g., a mercemoji is created within the animation asset application 112A and then shared with the animation asset application 112B on the user device 102B), the animation asset application 112A need not share the entire mercemoji across the network 104. Instead, in some embodiments, the input file and a value indicative of the animation asset is transmitted across.

Continuing the example where the mercemoji is shared with another animation asset application, the user creates a mercemoji using an audio file and a selected animation asset on the user device 102A. The user of the user device 102A decides to share the mercemoji with the user of the user device 102B. In this example, the user device 102A transmits the audio file 128 and a value indicative of the animation asset 130 by way of network 104. In some embodiments, the user device 102B receives the audio file 128 and the value indicative of the animation asset 130 directly from the user device 102A.

In some embodiments, the animation asset applications are managed by the server 107, and when mercemojis are shared between users, associated data is transferred through the server 107. Still continuing the example where the mercemoji is shared with another animation asset application, the user device 102A transmits the audio file 128, the value indicative of the animation asset 130, and a value indicative of an account 132 to the server 107. In turn, the server 107 determines an account 136A associated with the received value indicative of an account 132 (e.g., by using a lookup table, where the value indicative of the account is a pointer), and further determines the user device 102B is associated with the account 136A. More specifically, the server 107 may maintain a lookup table that tracks various accounts 136 and respective values indicative of the account as well as computing devices associated with the account. For example, the user device 102B is logged into the animation asset application 112B using account 136A. The lookup table managed by the server 107 contains an entry where the account 136A is associated with the value indicative of the account (e.g., value indicative of the account 136A), as well as the user device 102B.

Subsequently, the server 107 transmits the audio file 128 and the value indicative of an animation asset 132 to the user device 102B. Upon receiving the audio file 128 and the value indicative of an animation asset 132, the animation asset application 112B on the user device 102B, re-creates the mercemoji (e.g., selects the 3-D emoji associated with the value indicative of an animation asset 132, defines control signals for the controls of the 3-D emoji) and displays the mercemoji to the user of the user device 102B. To the user of the user device 102B, it will appear as if the entire mercemoji was transmitted across, instead of just the audio file 128 and the value indicative of the animation asset 132.

Accordingly, two manners of sharing the mercemoji between user devices 102 executing the animation asset application 112 has been described. In another example, the user of the user device 102A may choose to share a mercemoji with an application different from the animation asset application. For purposes of this example, the user of the user device 102A chooses to share a mercemoji with a user having an account in the social networking system 122 and executing the application 120. In this example, the animation asset application 112A determines the mercemoji will be shared with a user device that does not have the animation asset application 112, and accordingly, the animation asset application 112A captures a created mercemoji in a video file format that supports sound (e.g., MP4, AVI) and transmits the video file 138 to the social networking system 122, along with a value indicative of a user account.

In turn, the social networking system 122, determines a user account 126 associated with the value indicative of the user account. For purposes of this example, the social networking system 122 determines the value indicative of the user account is associated with the account 126A and the account 126A is associated with the user device 102X. Accordingly, the social networking system 122 transmits the video file 138 to the user device 102X, where a user of the user device 102X views the mercemoji captured in the video file 138. In this example, the application 120 does not re-create the mercemoji from a received audio file in live-time, instead the entire video file 138 is received by the application 120.

Accordingly, a mercemoji is created and shared with user devices within the example system architecture 100. The methods described herein effects transformation of an animation asset to a mercemoji. As the mercemoji is customizable not only in appearance but also in motion and sound, a user experience is increased as she is able to more fully express herself. For example, the mercemoji can be created with a recording of the user's voice. The user experience is increased as the mercemoji will be saying her words in her voice—thus allowing her to more fully express herself.

Figure 2:
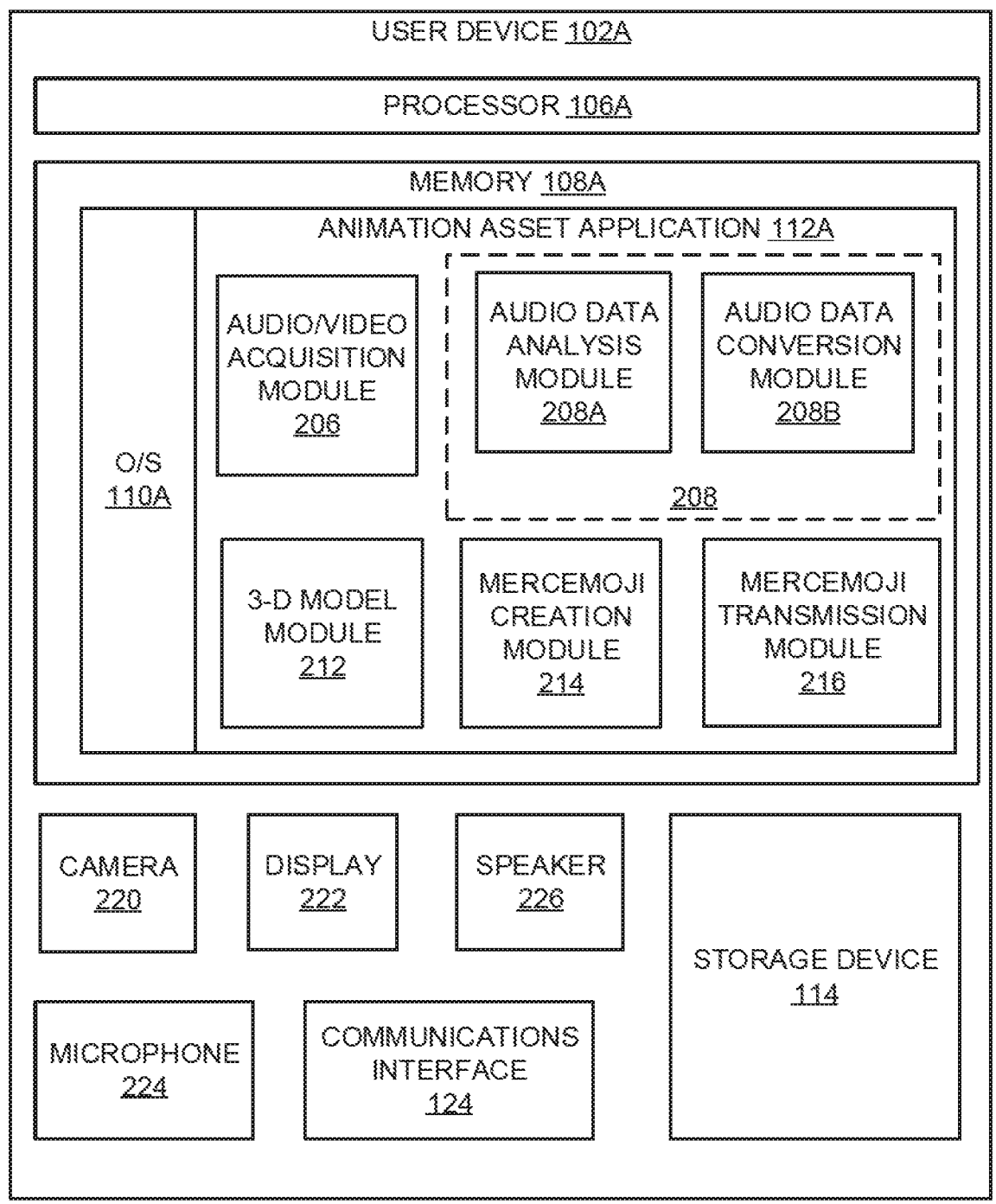
FIG. 2 shows a block diagram of a user device, in accordance with some embodiments.

FIG. 2 shows a block diagram of a user device 102 in accordance with example embodiments. In particular, FIG. 2 shows additional aspects of the user device 102A. In addition to the processor 106A, the memory 108A, the communications interface 124, and the storage device 114 described in FIG. 1, the user device 102A includes a camera 220, a display 222, and a microphone 224. The camera 220 can include any type of device including lenses and sensors embedded within the user device 102A used to capture images and video. The microphone 224 includes a transducer embedded within the user device 102A used to capture sound and convert it into an electrical signal.

The example user device of FIG. 2 further includes a speaker 226 that acts as a transducer (e.g., an electromagnet, a permanent magnet, a cone of material, and various circuits) that produce sound based off an electric signal. The speaker 226 can be used to listen to a person talk during a phone call, to listen to digital audio files (e.g., including speech or music) and watch videos with an audio component (e.g., view a mercemoji). The display 222 includes a screen of any suitable size, and can utilize any known or future type of screen technology—e.g., in-plane switching, liquid-crystal displays, light-emitting diodes, organic light-emitting diodes, and active-matrix organic light-emitting diodes. The display 222 is used to view the mercemoji in motion while a playback of associated audio is heard out of the speaker 226.

Next, example modules executing within the animation asset application 112A that are used to create and share a mercemoji include an audio/video acquisition module 206, an audio data analysis module 208A, an audio data conversion module 208B, a 3-D model module 212, a mercemoji creation module 214, and a mercemoji transmission module 216. As used herein, a module is a part of a program. Programs are composed of one or more modules that are not combined until the program is linked. The modules can be developed in different programs, and on occasion, an additional interface is used to enable the modules to work seamlessly together.

In various embodiments, the 3-D model module 212 stores a plurality of animation assets that are selectable based on a user input. Each animation asset can include logic that defines a 3-D appearance of the animation asset, and an animation package that further includes predefined controls that respond to control signals and cause a feature of the animation asset to move. An example animation asset is defined in a file in plain text or binary data, where the definition includes code defining features of the animation asset including: a geometry, an appearance, a scene (e.g., position of light sources, cameras, and peripheral objects), and animations (e.g., controls defining how the animation asset moves). The file is read by software (e., CAD software manufacturer such as Auto Desk® and Blender®) and as a result the animation asset is displayed to a user. Example formats for the animation asset include a Filmbox® ("FBX") format, and COLLADA.

For example, one animation asset may be given the appearance of an oval face, almond-shaped eyes (the eyes include the eye lids, sclera, and iris), and a pink mouth. One control of the animation asset controls changes in the oval face. Another control is associated with the almond-shaped eyes. For example, the control associated with the almond-shaped eyes can cause the shape of the eye lids to change and a location of the iris to move. A third control can cause the pink mouth to open, close, and otherwise change shape. In all these examples, the controls receive control signals to control how the features of the animation asset move.

Furthermore, each of the animation assets stored by the 3-D model module 212 is configurable or customizable based on a user selection. For example, the user can define hair type and color for the above animation asset. The user can define a skin tone of the animation asset, or add sunglasses to the animation asset. As a further example, the user can include facial piercings on the animation asset and facial hair. The foregoing examples are meant to illustrative and not meant to be limiting for examples in a manner in which each of the animation assets is customizable.

Various sources of digital media can be input into the audio/video acquisition module 206, including a recording captured through the microphone 224, a digital file that includes audio or video, and a video captured through the camera 220 to name a few examples. In one example, the audio/video acquisition module 206 captures a user singing into the microphone 224 of the user device 102A. In another example, a file including an audio clip from a movie is received by the audio-video acquisition module 206. Another additional source of the input file can be a received mercemoji from another animation asset application. That is, when a mercemoji is transmitted between different instances of the animation asset application, only the audio file and a value indicative of the animation asset, is transmitted and the receiving animation asset application creates the same mercemoji created by the sender. Examples of an input file acquired by the audio/video acquisition module 206 include a digital file that includes audio or video or defined animation without sound.

After the audio/video acquisition module 206 acquires the input file, the animation asset application 112A analyzes and converts the input file using the audio data analysis module 208A and the audio data conversion module 208B. The audio data analysis module 208A parses the input file and creates audio markers representing features of the input file. The audio data conversion module 208B takes the created audio markers and converts them to control signals. For example, where the input file is a recorded song, the audio data analysis module 208A determines where high notes are sung and where low notes are song to generate audio markers. The analysis module 208A can make this determination in relation to a time-continuum. As a further example, the audio data analysis module 208A determines at time t1, notes with a medium pitch are sung, and at time t2, notes with a high pitch are sung.

The audio data conversion module 208B then takes the generated audio markers and creates control signals applied to the animation asset at time t1 during playback, that cause the mouth of the animation asset to open partially (e.g., to coincide with the medium pitch). The audio data conversion module 208B creates control signals applied to the animation asset at time t2 during playback, that cause the mouth of the animation asset to open wider (e.g., to coincide with the high pitch). In various embodiments, the created control signals are output by the audio data conversion module 208B (e.g., as an output file). The simplistic example is not meant to be limiting. Overall, the modules 208 receive an input file, and create control signals that correlate to the data in the input file such that when the control signals are applied to an animation asset, the animation asset moves in a manner that is synchronous to the playback of the input file.

The mercemoji creation module 214 combines a selected animation asset (e.g., customized by the user) stored in the 3-D model module 212 with the output of the audio conversion module 208B ("output file") to create the mercemoji. Thus, the mercemoji creation module 214 displays the animation asset in motion according to the output file while playing back the input file—originally received by the audio/video acquisition module 206 in a synchronous manner.

In one example flow of the conversion process, the modules 208 read in input file (e.g., in an mp3 format) and generates data in a ".wav" format. The ".wav" file is analyzed in live-time to generate an animation sequence of the mouth of the animation asset (e.g., control signals). Subsequently the animation sequence is applied to the animation asset (e.g., in FBX format). The use of live-time here implies that the fully created mercemoji is not stored in memory, rather, the mercemoji is re-created upon receipt of the input file.

The mercemoji transmission module 216 prepares the created mercemoji for transmission over the network 104 (FIG. 1). As described in relation to FIG. 1, in some embodiments, the mercemoji transmission module 216 determines that the input file and a value indicative of the animation asset should be transmitted over the network 104. In other embodiments, the mercemoji transmission module 216 determines the mercemoji should be converted into a video format before being transmitted over the network 104. Accordingly, the mercemoji transmission module 216 performs the conversion and transmits the mercemoji in video format.

Figure 3:
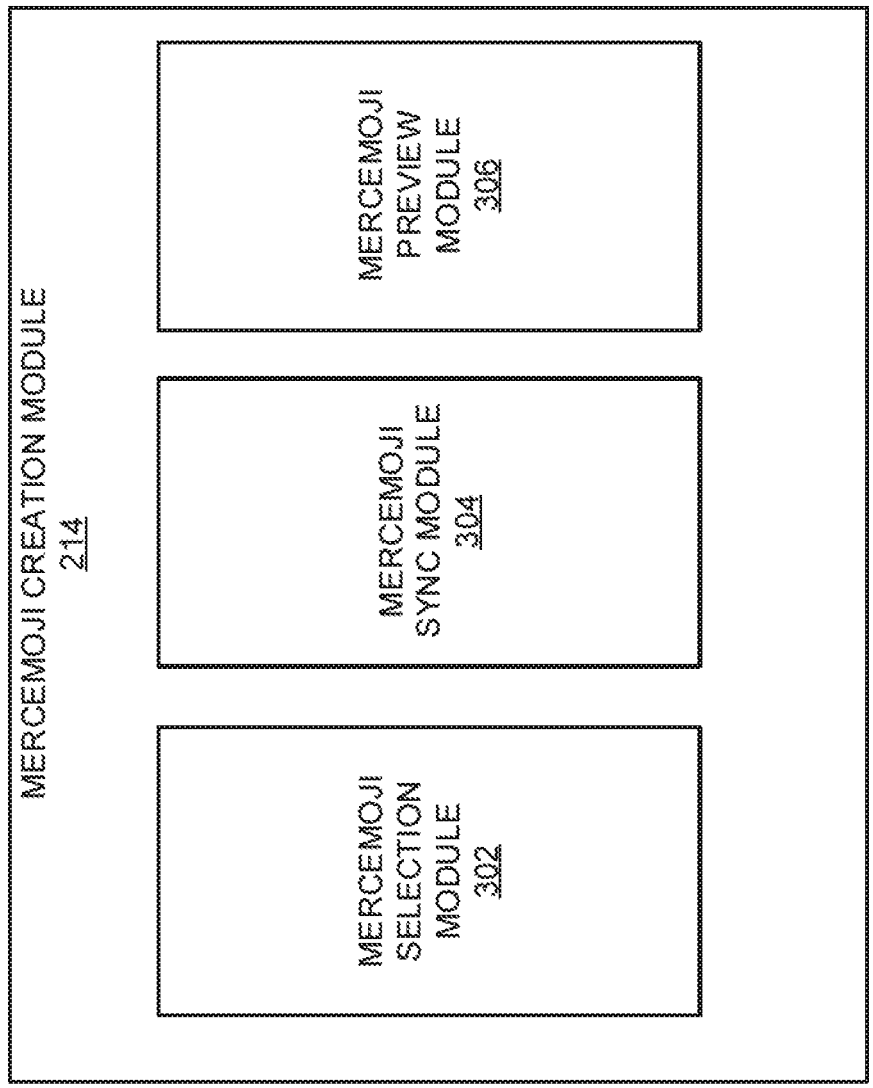
FIG. 3 shows a block diagram of a creation module, in accordance with some embodiments.

FIG. 3 shows, in block diagram form, a mercemoji creation module 214 is accordance with at least some embodiments. In particular, FIG. 3 illustrates additional aspects of the mercemoji creation module 214 including a mercemoji selection module 302, mercemoji sync module 304, and a mercemoji preview module 306. The mercemoji selection module 302 is configured to enable a user to select an animation asset stored in the 3-D model module 212 (FIG. 2). The mercemoji sync module 304 is configured to combine the output file from the audio data conversion module 208B (FIG. 2) with the selected animation asset and the mercemoji preview module 306 can display the mercemoji to the user.

In some embodiments, the mercemoji sync module 304 is configured to receive the input file directly, parse the input file and create control signals that are then applied to the selected animation asset. That is, in some embodiments, the mercemoji sync module 304 performs tasks similar to those performed by the audio data analysis module 208A and the audio data conversion module 208B.

Figure 4:
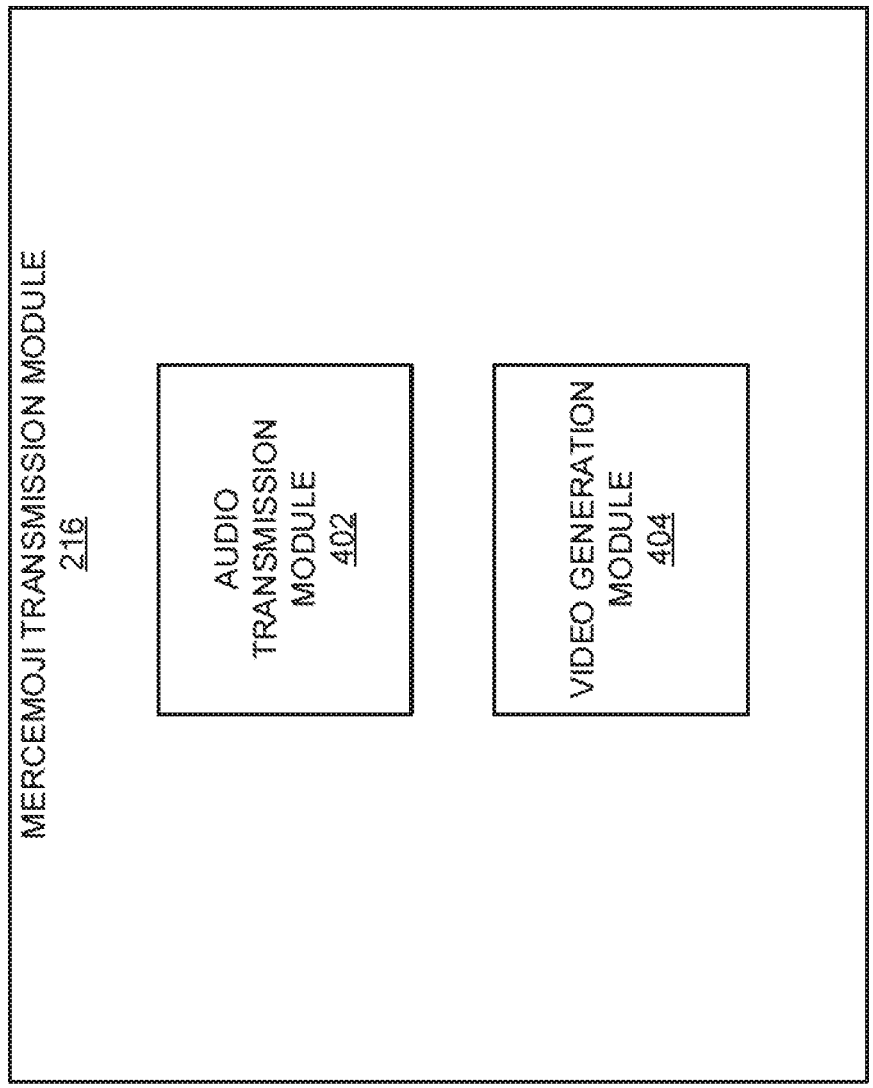
FIG. 4 shows a block diagram of a transmission module, in accordance with some embodiments.

FIG. 4 shows a block diagram of a mercemoji transmission module in accordance with at least some embodiments. In particular, FIG. 4 illustrates additional aspects of the mercemoji transmission module 216 including an audio transmission module 402, and a video generation module 404. As discussed previously, the mercemoji transmission module 216 determines a destination of the mercemoji, and transmits different types of data depending on the destination (e.g., a destination account). For example, when the mercemoji is transmitted to another animation asset application (e.g., animation asset application 112B, FIG. 1), the mercemoji transmission module 216 uses the audio transmission module 402 to transmit the input file, an indication of the animation asset, and an account identifier of the destination account to the server 107.

When the mercemoji is transmitted to an application different from the animation asset application, the video generation module 404 captures the mercemoji in a video format and transmit the video file along with an account identifier of the destination account. For example, the video generation module 404 transmits the video file and an account identifier of the destination account to the social networking system 122.

The methods and techniques described in FIGS. 1-4 enable a user to more fully express himself. Under related-art approaches rooted in computer technology, a user may manually type, touch, or click on a desired emoji in order to select and include the emoji in her communication. In some embodiments, the emoji may be preprogrammed to display the same animation sequence (e.g., a preprogrammed animation sequence that is unmodifiable). Thus between the static and animated emojis, a user experience and desire to express herself may be limited to the static and preprogrammed animated emojis formerly created by someone else. As such, related-art approaches can create challenges for and reduce overall user experiences associated with emojis.

By implementing the methods and techniques described above, the user experience is enhanced as the mercemoji is fully customizable down to the audio that is played back during a display of the mercemoji. The mercemoji moves and can have the appearance of speaking the words heard during the playback of the audio. Accordingly, the user experience is enhanced as he is more fully able to express himself.

Furthermore, by sharing a created mercemoji by transmitting simply an input file and a value indicative of the animation asset used to create the mercemoji, a computer system performance is increased as less data is transmitted than might otherwise be transmitted between user devices (e.g., less data than if the fully created mercemoji was transmitted). Additionally, the methods and techniques described herein effect a transformation of an animation asset to a different thing, a mercemoji.

FIGS. 5A-5F illustrate aspects of a graphical user interface 500 displayed on the display 222 of the user device 102A. In the GUI 500 a screen of the animation asset application is shown, including a plurality of selectable animation assets 502 and soft keys 504, 506, and 508. Each of the animation assets 502 is associated with a respective set of controls and is fully customizable. In this example, the user has already provided the input file by singing a phrase into the microphone. The input file is received by the audio/video acquisition module 206 (FIG. 2)

The example animation asset 502N has a lock indicating that a user can access the animation asset 502N after paying an additional fee or submitting additional credit. The user can select any of the available animation assets 502 to create a mercemoji. Each of the animation assets 502 is associated with a value indicative of the animation asset, where the value indicative of the animation asset is unique to the associated animation asset. For example, the animation asset 502A is associated with the value Q, while the animation asset 502N is associated with the value Y. Another animation asset application, upon receiving the value Q will know the selected animation asset is 502A.

In some embodiments, after the animation asset is customized, an associated value indicative of the animation asset is created, and the customized animation asset is added to the library of animation assets. The server 107 (FIG. 1) maintains a central database of the animation assets ("library") that each instance of the animation asset application 112A accesses. In accordance with some embodiments, the GUI 500 accesses the animation assets available in the library and displays the available animation assets.

The GUI 500 also presents soft keys to the user including "Mercemoji 504", "Chat 506", and "Send 508". Upon selection of the Mercemoji 504 soft key, the GUI 500 provides a plurality of animation assets to select from and enables the user to create a mercemoji. Selection of the "Chat 506" soft key enables the user to enter a chat application hosted through the animation asset application. Selection of the "Send 508" soft key enables the user to send a created emoji to another application.

Figure 5A:
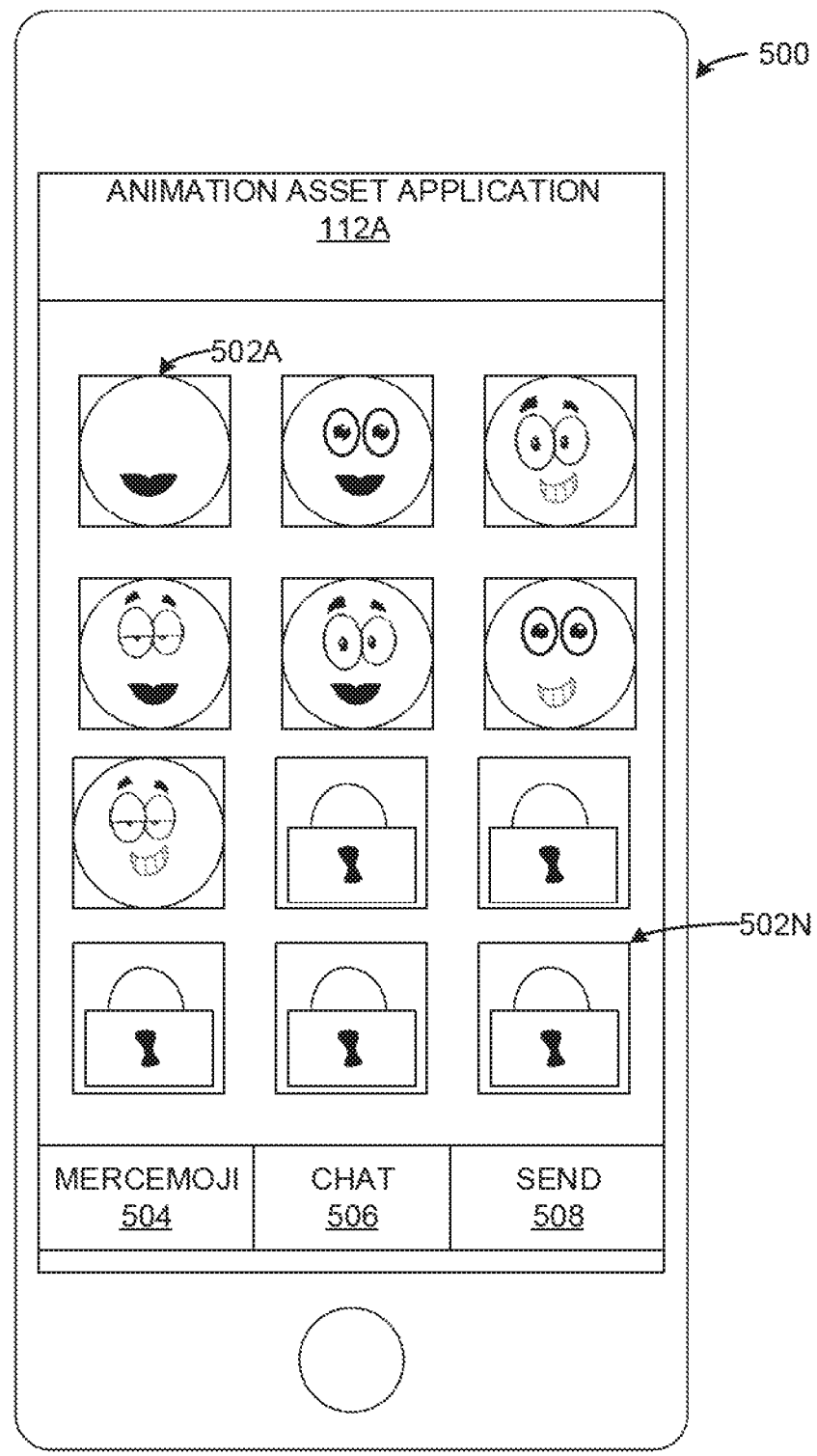
FIGS. 5A, 5B, 5C, 5D, 5E, and 5F show a graphical user interface, in accordance with some embodiments.
Figure 5B:
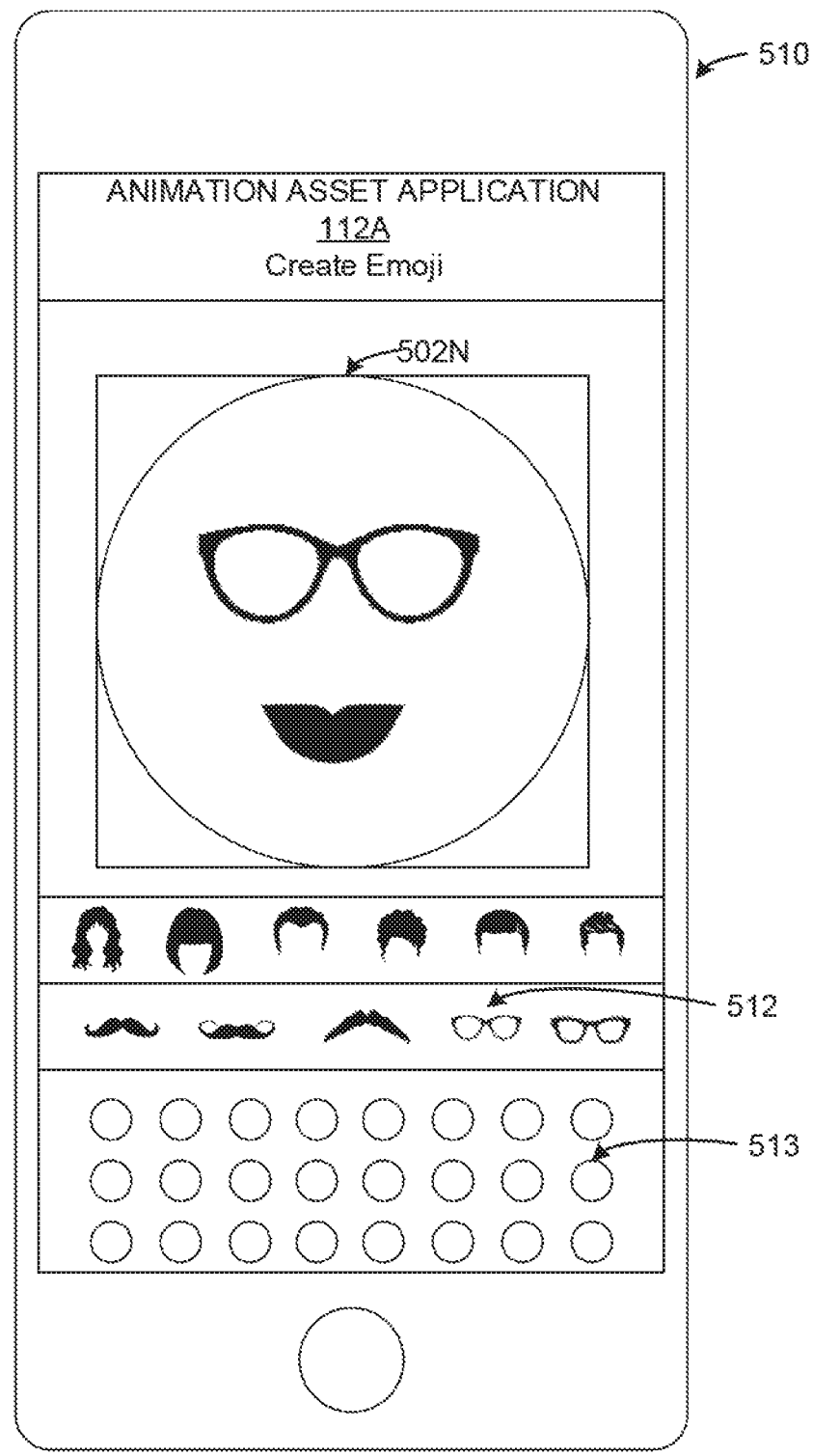

FIG. 5B illustrates an example GUI 510 presented to the user after the user selects the animation asset 502A (FIG. 5A). The GUI 510 presents an interface in which the user can customize an appearance of the animation asset 502A. Accordingly, the user is presented with various features he can add to the animation asset, including hair, facial hair, glasses and skin tone 513. The example features shown in GUI 510 are meant to be illustrative and not limiting examples of features. Additionally, the user can select other animation assets In this example, the user selects feature 512, and accordingly, the animation asset 502A is now animation asset 502N and includes the glasses.

Figure 5C:
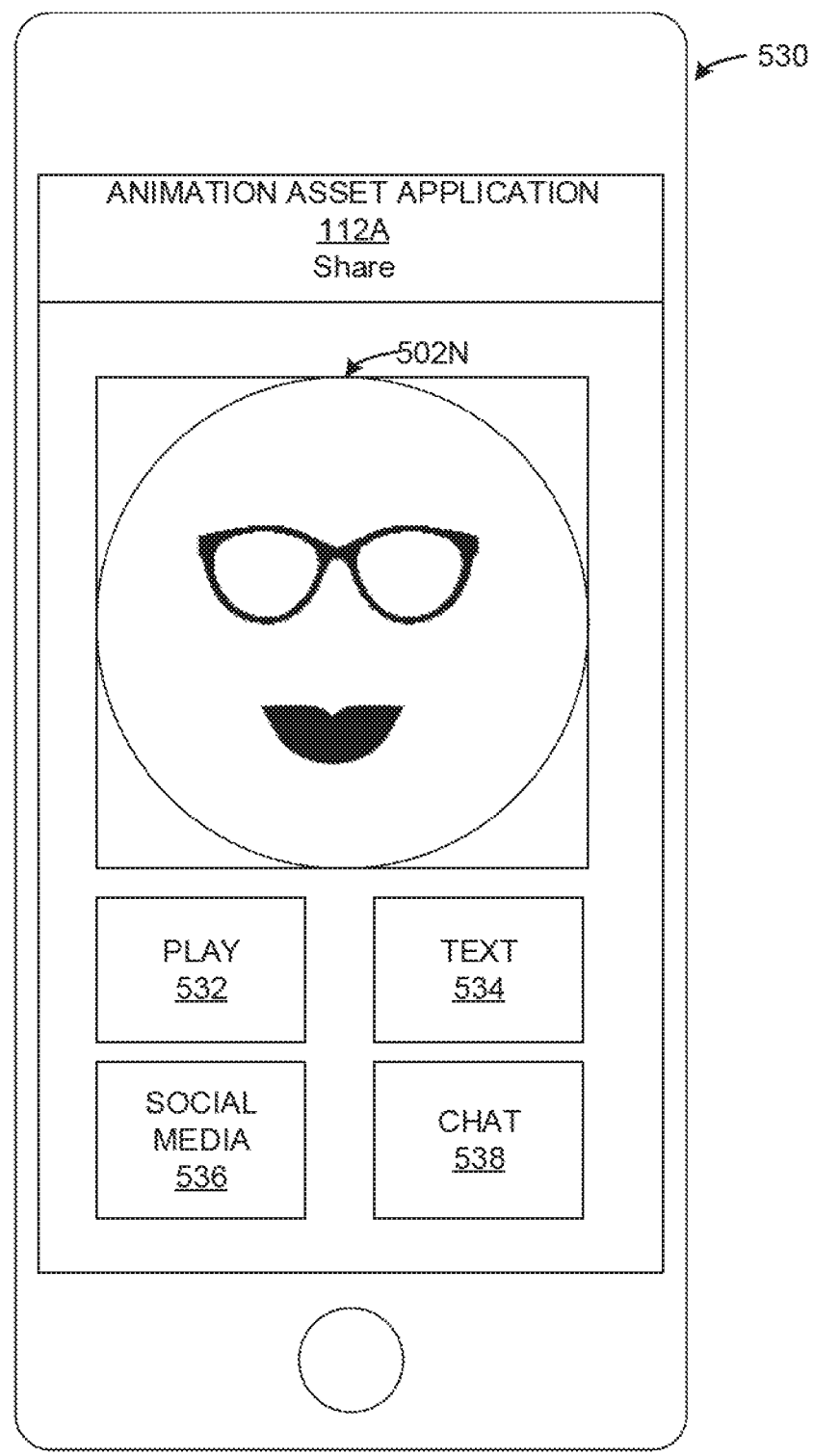

FIG. 5C illustrates an example GUI 530, in which the user can choose an action associated with the customized animation asset 502N. In this example prior to displaying the GUI 530, the animation asset application parses the input file (e.g., recorded phrase) to generate control signals in an output file and create the mercemoji. The mercemoji includes the combinations of the animation asset 502N and the output file. When a user chooses to preview the mercemoji (e.g., selects soft key "PLAY" 532), the animation asset application displays the animation asset 502N moving according to the control signal defined in the output file, while the input file is played back.

The GUI 530 includes the soft keys "PLAY" 532, "TEXT" 534, "SOCIAL MEDIA" 536, and "EMAIL" 538. The soft key "PLAY" 532 displays a preview of the mercemoji, and in some examples, the mercemoji preview module 306 (FIG. 3) provides the preview for display. The soft key "Text" 534 prepares the mercemoji for transmission through a text application. The text application enables two computing devices (e.g., smartphones) to send messages using a cellular network or also through an Internet connection. Example formats of a text message include Short Message Service (SMS) and multimedia message (MMS). In some embodiments, the mercemoji transmission module 216 (FIG. 4) prepares the mercemoji using the video generation module 404 (FIG. 4), and transmits the mercemoji as a video file through the text application.

The soft key "Social Media" 536 prepares the mercemoji for transmission to a social media application. Example social media applications include the animation asset application 112A and the application 120. Depending on the social media application chosen by the user, the mercemoji transmission module 216 (FIG. 4) transmits the mercemoji using the video generation module 404 (FIG. 4) or the audio transmission module 402 (FIG. 4). The soft key "CHAT" 538 prepares the mercemoji for transmission through a chat program internal to the animation asset application. The mercemoji transmission module 216 (FIG. 4) transmits the mercemoji using the audio transmission module 402 (FIG. 4).

Figure 5D:
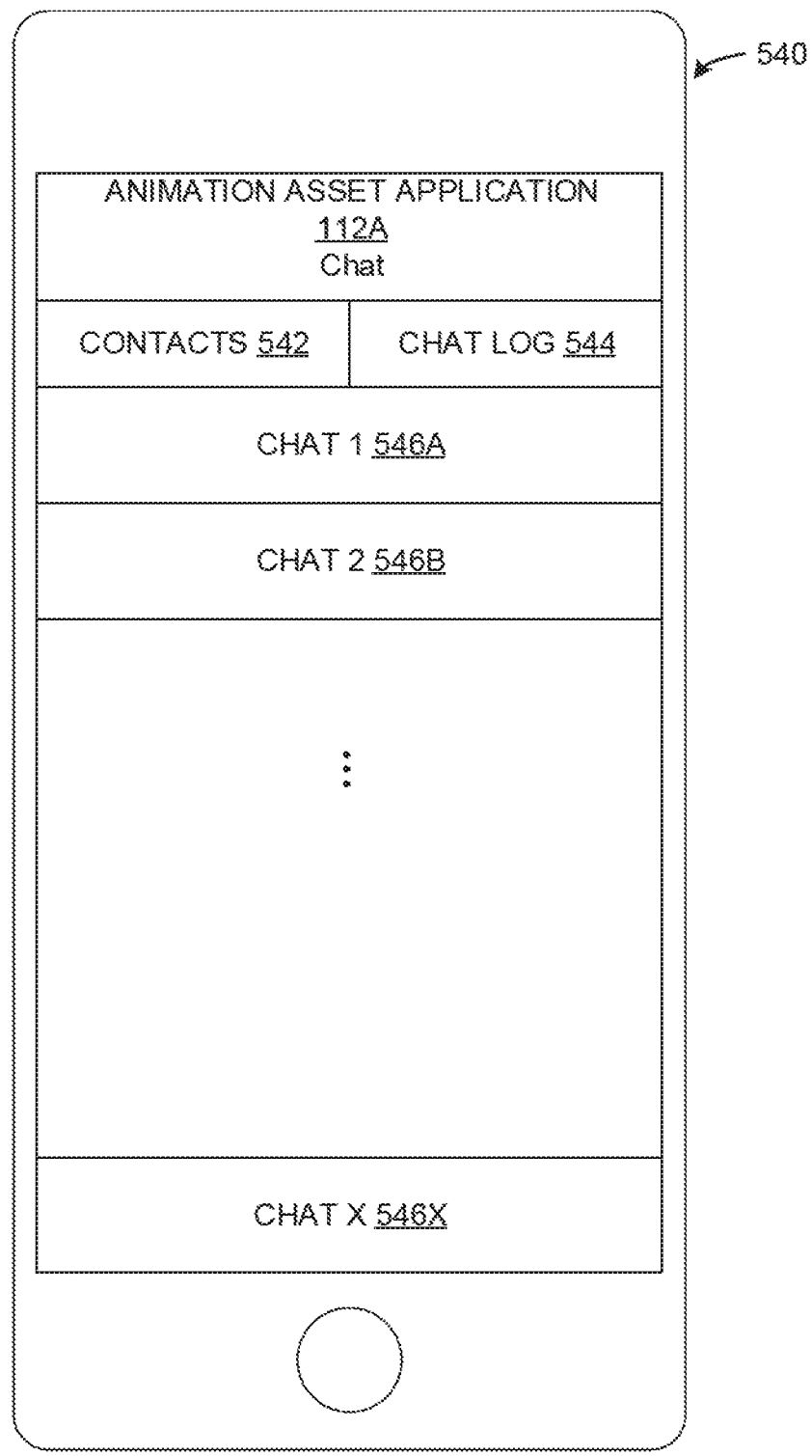

In FIG. 5D, the user has selected the soft key "CHAT" 538, and a subsequent GUI 540 is displayed to the user. The GUI 540 displays the soft keys "CONTACTS" 542 and "CHAT LOG" 544. When "CONTACTS" 542 is selected, a list of contacts is shown. When the "CHAT LOG" 544 is selected, a log of prior chats is displayed. Additionally, the GUI 540 displays current active chats (546) that the user can select to send the created mercemoji to.

Figure 5E:
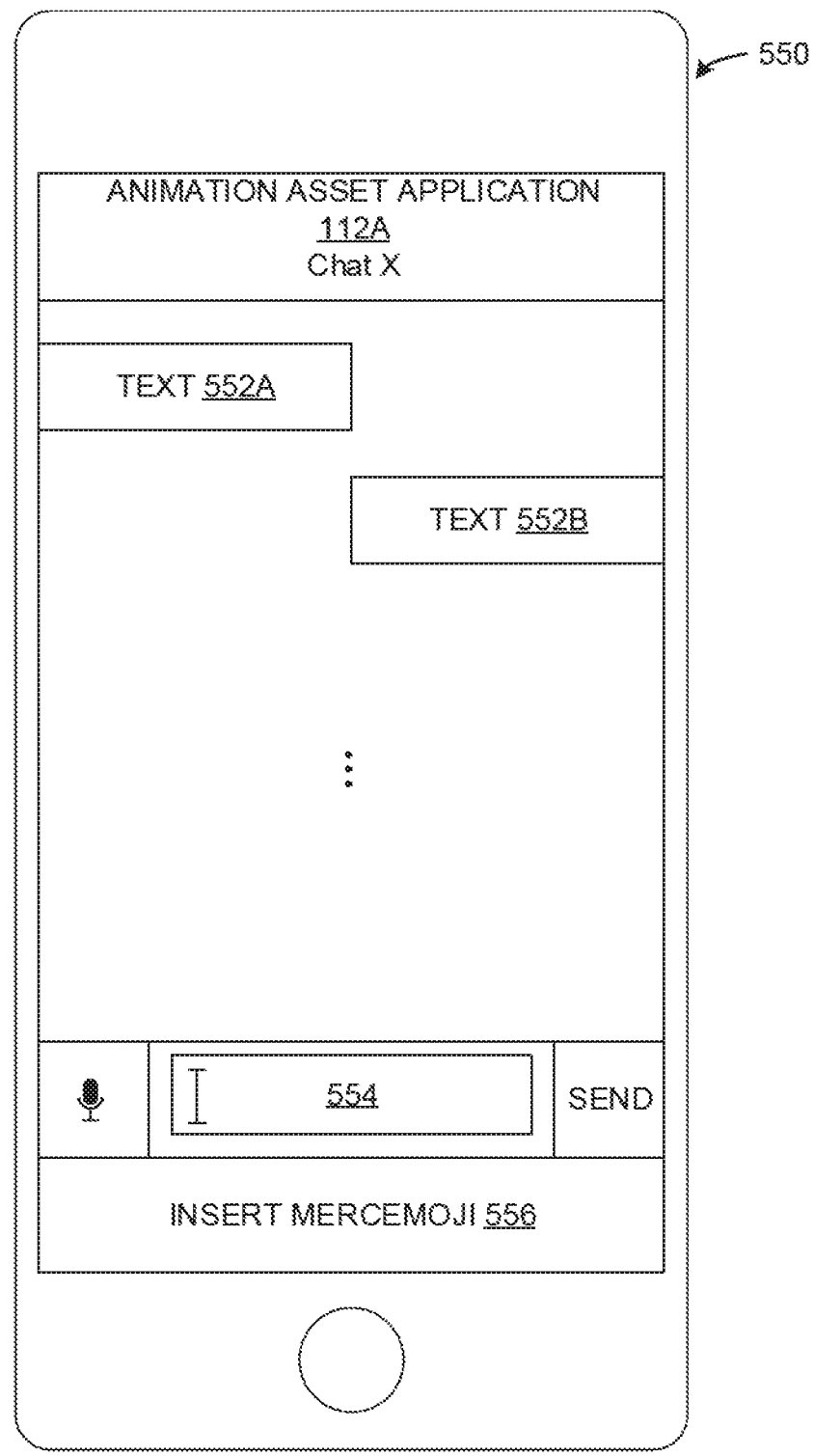

In FIG. 5E, the user selects the chat 546X, and a corresponding GUI 550 is displayed to the user. The GUI 550 illustrates a chat dialogue (e.g., including text 552) between the user and another user with an account in the animation asset application. A box 554 is provided at the bottom of the GUI 550 to insert text. Additionally, a soft key "INSERT MERCEMOJI" 556 is provided below the box 554.

Figure 5F:
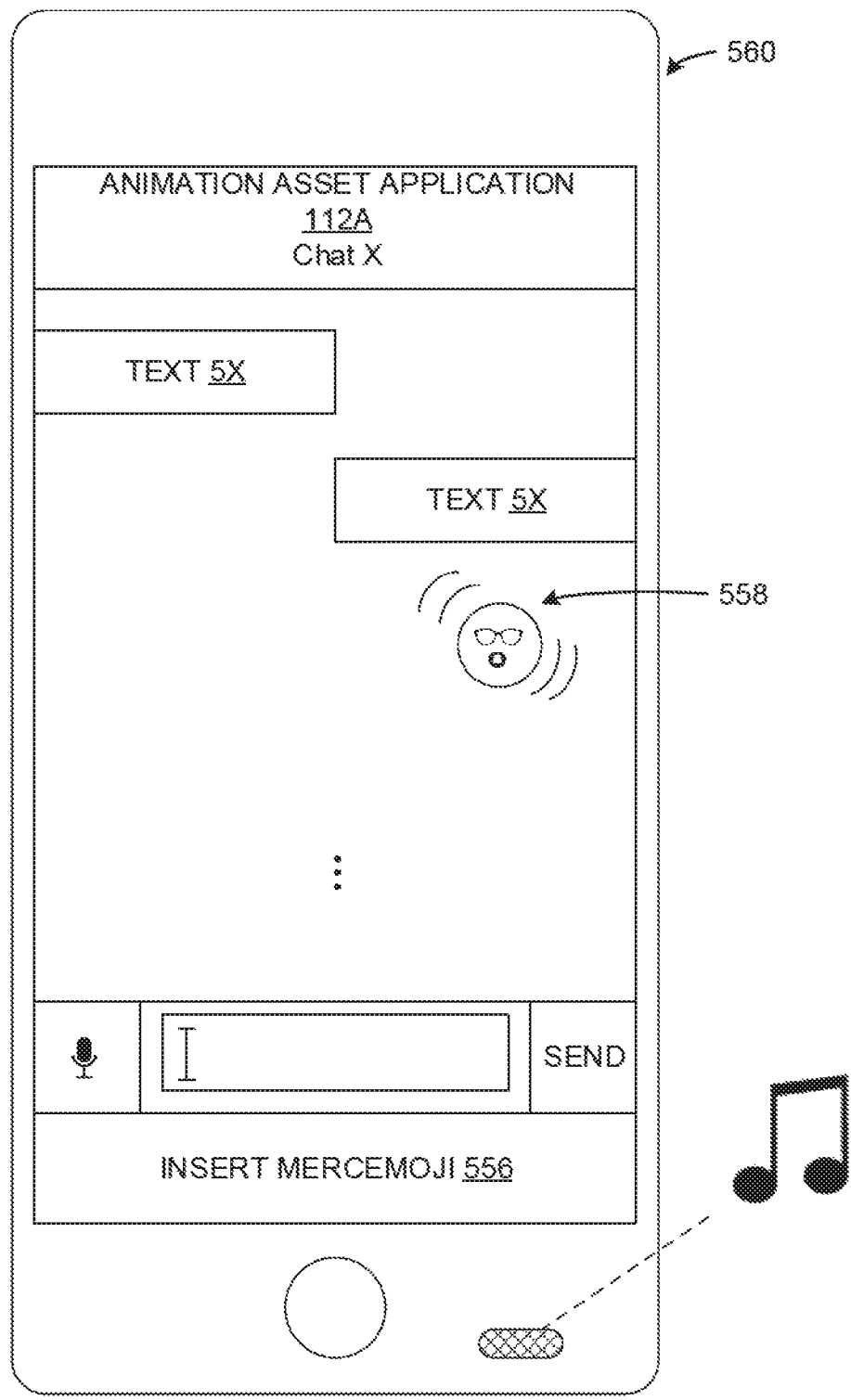

In FIG. 5F, the user select the soft key "INSERT MERCEMOJI" 556, and the corresponding GUI 560 is displayed to the user. As shown the mercemoji 558 is displayed as part of the chat dialogue. The mercemoji 558 is displayed as moving in a synchronous manner to a playback of the input file. In one example, the mercemoji 558 has lips that move according to the words heard during the playback of the input file.

Figure 6:
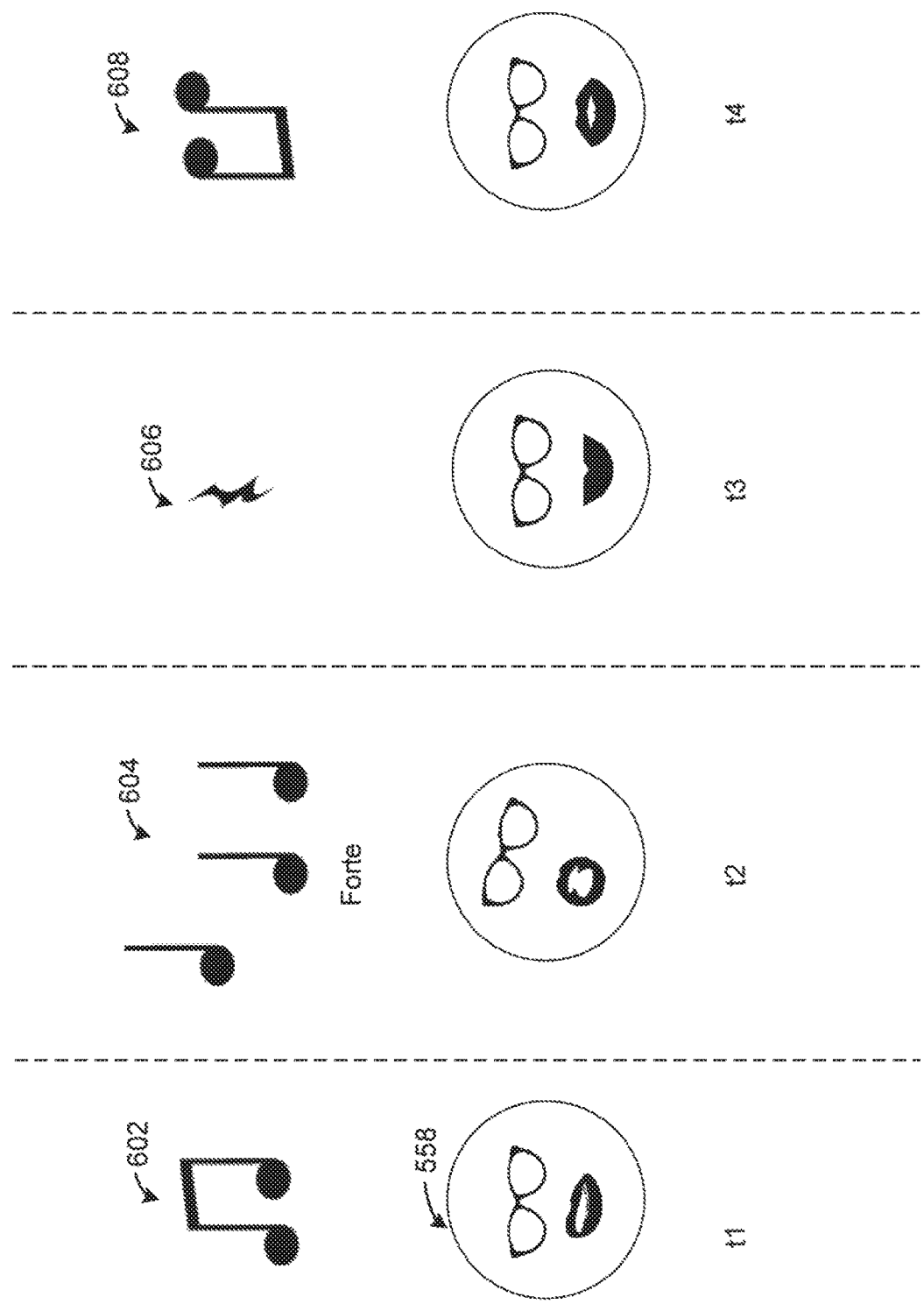
FIG. 6 shows an example Mercemoji, in accordance with some embodiments.

FIG. 6 shows an example Mercemoji along a time continuum, in accordance with some embodiments. In the example of FIG. 6, aspects of the input file are shown along the top of the time continuum, such as a music note corresponding to the audio in the input file. At time t1, the notes 602 in the input file are sung at a medium pitch. During time t2, the notes 604 in the input file are sung at a higher pitch and loudly. At time t3, there are no notes sung (e.g., rest 606) in the input file (e.g., there is silence), and at time t4, the notes 608 in the input file are sung at a low pitch and a quiet volume.

Each of these aspects of the input file are identified when the input file is parsed by the audio data analysis module 208A (FIG. 2). The audio data conversion module 208B (FIG. 2) converts the identified aspects to control signals that are applied to the animation asset at particular times. For example, the audio data conversion module 208B creates control signals to partially open the mouth of the animation asset at time t1 to correspond to the notes 602. As the notes 604 are such at a higher pitch and loudly, the audio data conversion module 208B creates control signals, that correspond to time t2 during playback and that open the mouth wider. The audio data conversion module 208B creates controls signals that correspond to time t3 during playback that close the mouth of the mercemoji, and control signals that correspond to time t4 during playback that partially open the mouth of the mercemoji.

When the mercemoji 558 is viewed, the user will see the mouth of the mercemoji 558 move according to the control signal described such that during playback of the audio file, at time t1, the user will hear the notes 602 and see the mercemoji with a partially open mouth, at time t2, the user will hear the notes 604 and see the mercemoji with a wider open mouth, at time t3, the user will hear silence and the mercemoji with a closed mouth, and at time t4, the user will hear notes 608 and the mercemoji with a partially open mouth. The example provided in FIG. 6 is not meant to be limiting and provides a simple example. Various embodiments, will create animation and motion in the animation asset to a much more complicated degree. For example, the mercemoji has the capability to moves its mouth in ways that mimic a person speaking or singing.

Figure 7:
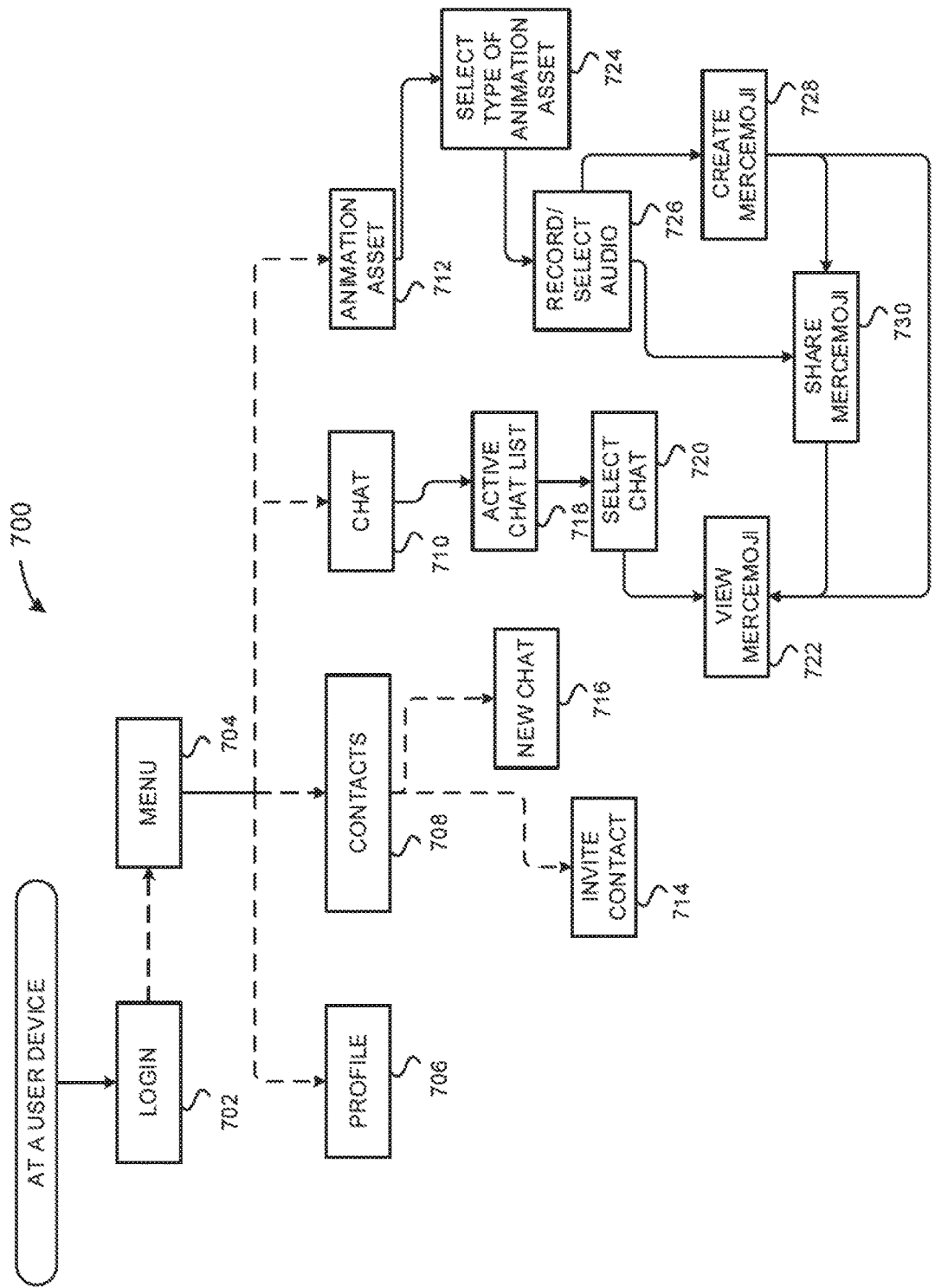
FIG. 7 shows a flowchart, in accordance with some embodiments.

FIG. 7 illustrates a flowchart, in accordance with various embodiments. The method steps occur at a user device (e.g., the user device 102A) and through the animation asset application 112A. At 702, initially the user is prompted to login. After receiving login credential, the animation asset application displays a menu (block 704) allowing the user to create or modify a user profile (block 706), view contacts (block 708), chat (block 710), or choose an animation asset (block 712).

Under the contacts menu item, the user is given two options 1) invite a new contact (block 714) or create a new chat (block 716). Under the chat menu item, the user has the option of viewing an active chat list (block 718), selecting a chat (block 720), and viewing a mercemoji (block 722). Under the animation asset menu item, the user selects a type of animation asset (block 724) and records or selects an input file (block 726). Afterwards, the flow forks into two paths, the user can either create the mercemoji on his device (block 728) or choose to share the mercemoji with or without creating the mercemoji (block 730). For example, the user can simply pick an animation asset, and provide an input file and then directly choose to share the mercemoji. When the mercemoji is shared with another device, the value indicative of the animation asset and the input file are transmitted over, at which point another device creates the mercemoji (e.g., in live-time). In this manner, a user can share the mercemoji without creating the mercemoji on his device. Either way, whether the user selects to create to mercemoji or share without creating the mercemoji, the user can view the mercemoji (block 722).

Figure 8:
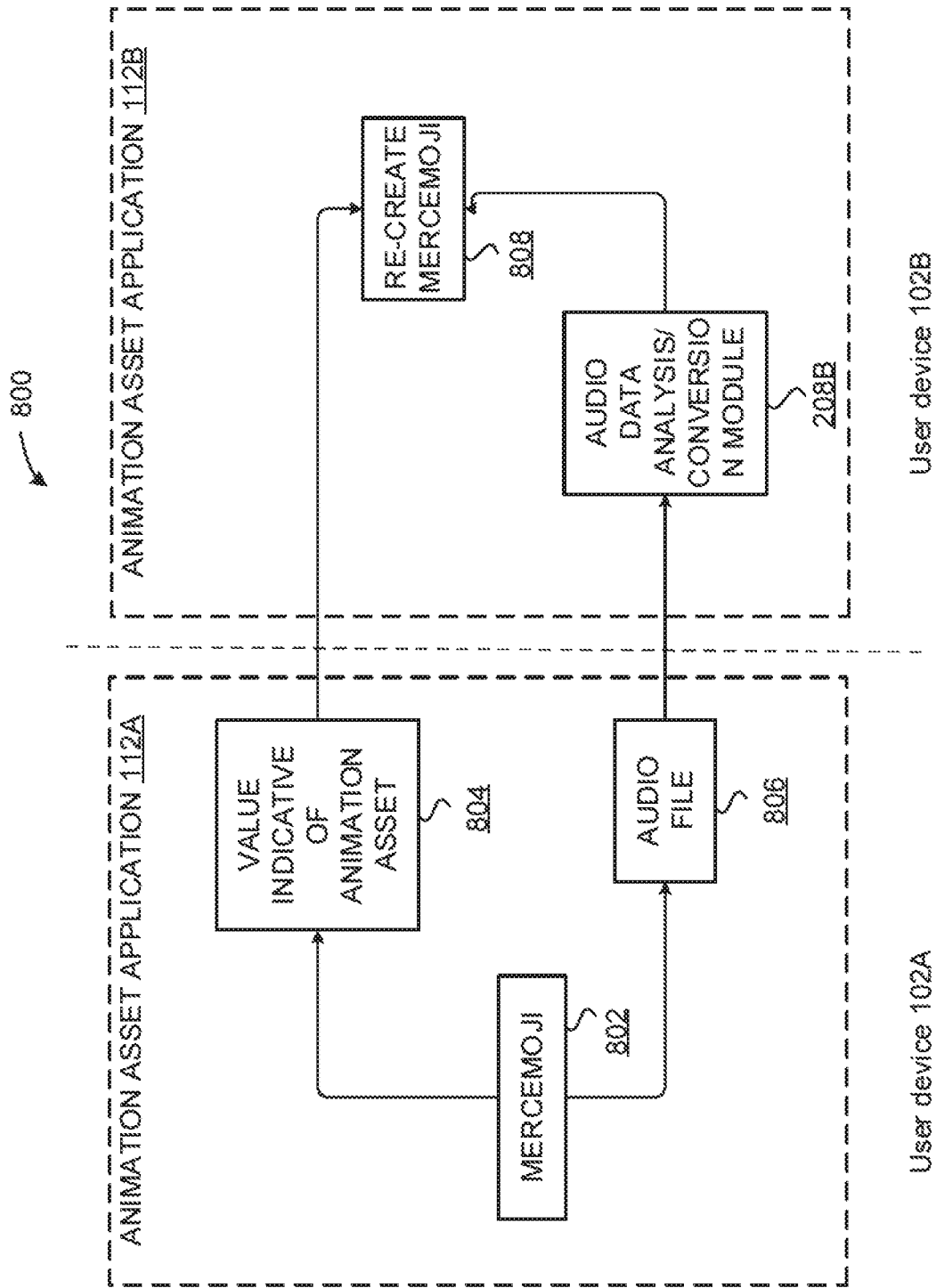
FIG. 8 shows a flowchart, in accordance with some embodiments.

FIG. 8 illustrates a flowchart, in accordance with various embodiments. The method illustrated in FIG. 8 illustrates an example in which a mercemoji is shared between devices that both have the animation asset application installed. The example flow can occur when the mercemoji is shared through a chat program internal to the animation asset application. In the illustrations, a dashed line separates a representation of the operating space of the user device 102A and a representation of the operating space of the user device 102B. For each of the devices, the operating space represents spaces implemented by the components in the user devices, including the processor, memory, and the storage device.

Within the operating space of the user device 102A, a mercemoji 802 is created. The user device 102A stores the value indicative of the animation asset 804, and an audio file 806. To transmit the mercemoji to the user device 102B, the animation asset application 112A uses the audio transmission module 402 to transmit the audio file 806 and a value indicative of the animation asset 804. In the event the audio transmission module 402 communicates the data to the server 107, the animation asset application 112A also transmits an account identifier. In turn the server 107 determines the user device 102B corresponds to the account identifier, and sends the audio file 806 and the value indicative of the animation asset 804 to the user device 102B.

In this example, the animation asset application 112A transmits the audio file 806 and the value indicative of the animation asset 804 directly to the user device 102B. Accordingly, the animation asset application 112B operates within the operating space of the user device 102B and receives both the audio file 806 and the value indicative of the animation asset 804. Subsequently, the animation asset application 112B recreates the mercemoji (block 808), for example by using the mercemoji creation module (FIG. 3).

Figure 9:
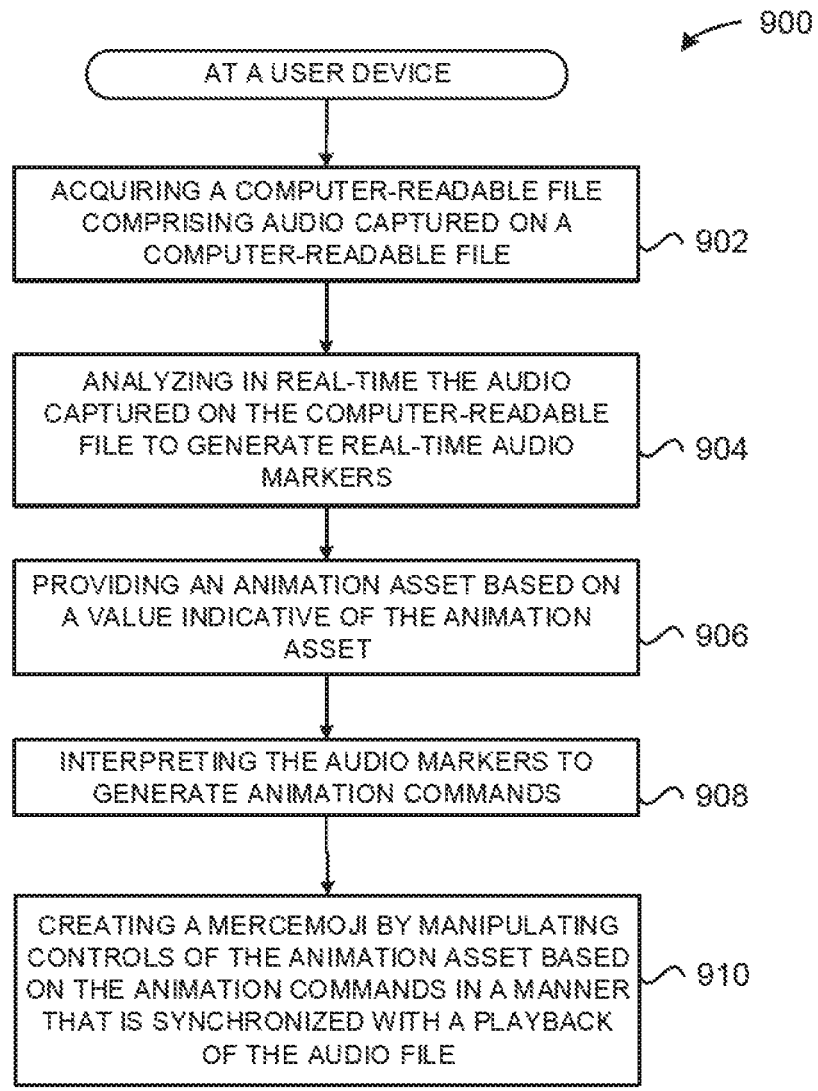
FIG. 9 shows a method, in accordance with some embodiments.

FIG. 9 is a method diagram in accordance with at least some embodiments. In particular, the method starts (block 900) and includes: acquiring a computer-readable file comprising audio captured on a computer-readable file (block 902); analyzing in real-time the audio captured on the computer-readable file to generate real-time audio markers (block 904); providing an animation asset based on a value indicative of the animation asset (block 906); interpreting the audio markers to generate animation commands (block 908); and creating a mercemoji by manipulating controls of the animation asset based on the animation commands in a manner that is synchronized with a playback of the audio file (block 910). Thereafter the method ends.

Figure 10:
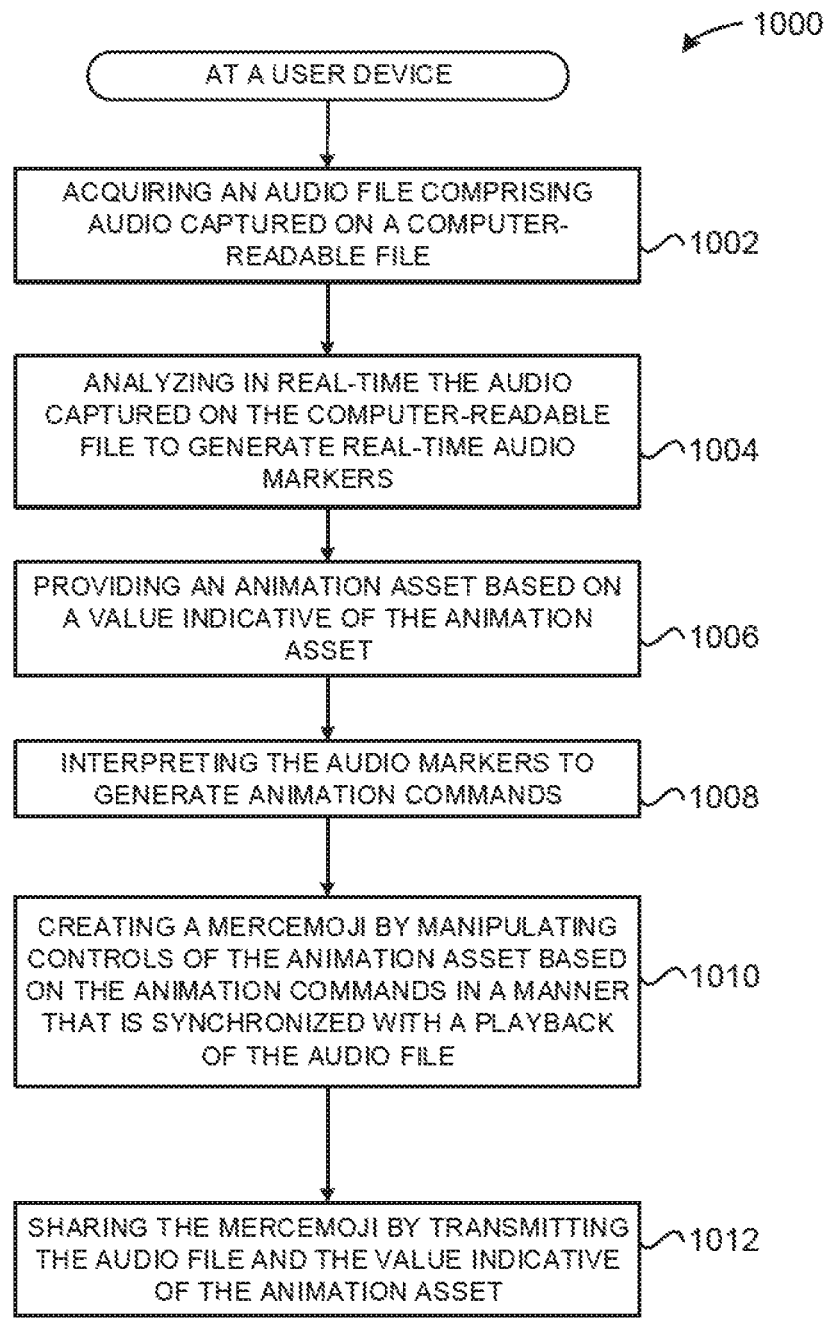
FIG. 10 shows a method, in accordance with some embodiments.

FIG. 10 is a method diagram in accordance with at least some embodiments. In particular, the method starts (block 1000) and includes: acquiring an audio file comprising audio captured on a computer-readable file (block 1002); analyzing in real-time the audio captured on the computer-readable file to generate real-time audio markers (block 1004); providing an animation asset based on a value indicative of the animation asset (block 1006); interpreting the audio markers to generate animation commands (e.g., control signals) (block 1008); creating a mercemoji by manipulating controls of the animation asset based on the animation commands in a manner that is synchronized with a playback of the audio file (block 1010); and sharing the mercemoji by transmitting the audio file and the value indicative of the animation asset (block 10102). Thereafter the method ends.

Figure 11:
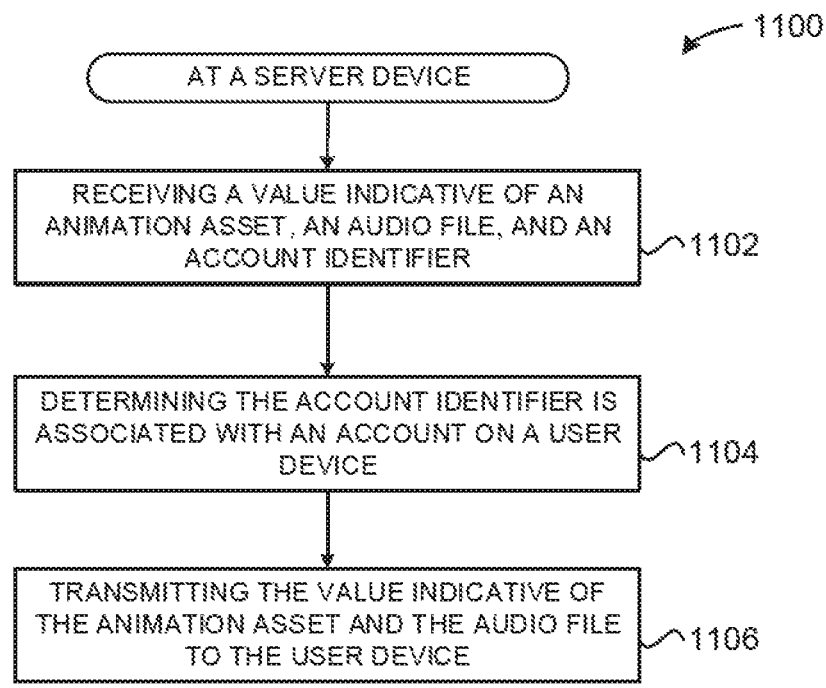
FIG. 11 shows a method, in accordance with some embodiments.

FIG. 11 is a method diagram in accordance with at least some embodiments. In particular, the method starts (block 1100) and includes: receiving a value indicative of an animation asset, an audio file, and an account identifier (block 1102); determining the account identifier is associated with an account on a user device (block 1104); and transmitting the value indicative of the animation asset and the audio file to the user device (block 1106). Thereafter the method ends.

Figure 12:
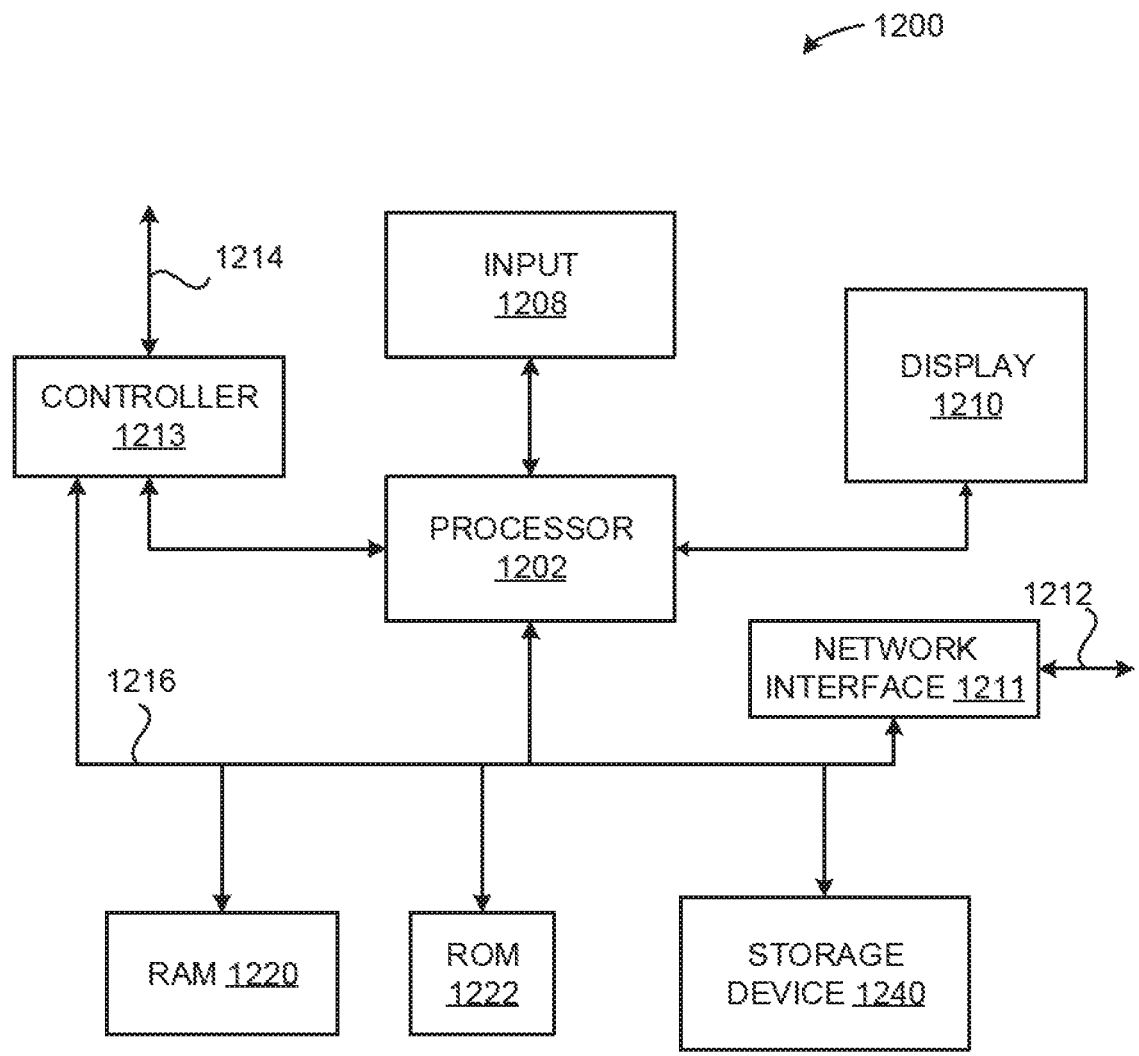
FIG. 12 shows a detailed view of a computing device that can represent the computing devices of FIG. 1 used to implement the various methods and system architectures described herein, in accordance with some embodiments.

FIG. 12 illustrates a detailed view of a computing device 1200 that can represent the computing devices of FIG. 1 used to implement the various techniques described herein, according to some embodiments. For example, the detailed view illustrates various components that can be included in the server 107, the social networking system 122, or user devices 102 described in conjunction with FIG. 1. As shown in FIG. 12, the computing device 1200 can include a processor 1202 that represents a microprocessor or controller for controlling the overall operation of the computing device 1200. The computing device 1200 can also include a user input device 1208 that allows a user of the computing device 1200 to interact with the computing device 1200. For example, the user input device 1208 can take a variety of forms, such as a button, keypad, dial, touch screen, audio input interface, visual/image capture input interface, input in the form of sensor data, and so on. Still further, the computing device 1200 can include a display 1210 that can be controlled by the processor 1202 (e.g., via a graphics component) to display information to the user. A data bus 1216 can facilitate data transfer between at least a storage device 1240, the processor 1202, and a controller 1213. The controller 1213 can be used to interface with and control different equipment through an equipment control bus 1214. The computing device 1200 can also include a network/bus interface 1211 that couples to a data link 1212. In the case of a wireless connection, the network/bus interface 1211 can include a wireless transceiver.

As noted above, the computing device 1200 also includes the storage device 1240, which can comprise a single disk or a collection of disks (e.g., hard drives). In some embodiments, storage device 1240 can include flash memory, semiconductor (solid state) memory or the like. The computing device 1200 can also include a Random-Access Memory (RAM) 1220 and a Read-Only Memory (ROM) 1222. The ROM 1222 can store programs, utilities or processes to be executed in a non-volatile manner. The RAM 1220 can provide volatile data storage, and stores instructions related to the operation of applications executing on the computing device 1200.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for creating a mercemoji, comprising:
acquiring, by an application executed by a computing system, an audio file comprising audio captured on a computer-readable file;
generating, by the application, audio markers by analyzing the audio captured on the computer-readable file;
generating, by the application, animation commands by interpreting the audio markers; wherein an animation command comprises one or more control signals,
receiving a value indicative of an animation asset, wherein the animation asset defines controls associated with portions of the animation asset, wherein a respective control is configured to cause a respective portion of the animation asset to move based on a respective animation command provided to the respective control;
creating, by the application, a first mercemoji by moving the animation asset based on the animation commands provided to the controls in a manner that is synchronized with a playback of the audio file;
inputting the first mercemoji in a chat program implemented by the application;
receiving, from a server, a second audio file comprising additional audio;
receiving, from the server, a second value indicative of a second animation asset;
generating, by the application, second audio markers by analyzing the second audio file;
generating, by the application, second animation commands by interpreting the second audio markers; and
creating, by the application, a second mercemoji based on the second animation asset and the second animation commands.

2. The method of claim 1, wherein inputting the first mercemoji in the chat program further comprises:
determining a destination location for the first mercemoji; and
transmitting, to the server, the audio without the animation asset, wherein the server is configured to perform back-end services associated with the chat program.

3. The method of claim 2, wherein inputting the first mercemoji in the chat program further comprises, determining the destination location for the first mercemoji is a device associated with the chat program.

4. The method of claim 1, wherein generating animation commands further comprises:
assessing an audio marker indicating a high tone, the high tone occurring in a discrete portion of the audio; and
mapping the audio marker to a first animation command, the first animation command specifying a shape of a mouth of the animation asset, wherein a control of the animation asset is configured to move the mouth in response to and in a manner defined by the first animation command.

5. The method of claim 1, further comprising:
receiving a request to send the first mercemoji to a social network different from the application;
converting the first mercemoji to a video file; and
transmitting the video file to a server of the social network.

6. A system configured to create a mercemoji, comprising:
a processor;
a memory coupled to the processor;
the memory storing a program that, when executed by the processor, causes the system to:
acquire a computer-readable file including audio;
generate audio markers by analyzing the audio captured on the computer-readable file;
generate a set of control signals based on the audio markers;
receive, a value indicative of an animation asset, wherein:
the value is based on a user selection of the animation asset,
the animation asset defines controls associated with portions of the animation asset,
the controls are configured to respond to the set of control signals; and
a respective control is configured to cause a respective portion of the animation asset to move in response to a respective control signal;
create the mercemoji by combining the animation asset, the computer-readable file, and the control signals;
input the mercemoji in a communication made by a user;
receive, from a server, an audio file associated with an incoming message, the server configured to perform back-end services associated with a chat program;
receive, from the server, a different value indicative of a second animation asset;
generate second audio markers by analyzing the audio file;
generate a second set of control signals based on the second audio markers; and
create a second mercemoji by manipulating controls of the second animation asset based on the second set of control signals in synchronization with a playback of the audio file, wherein a displayed movement of one or more portions of the second animation asset is based on the manipulation of the controls of the second animation asset.

7. The system of claim 6, wherein the program further causes the system to:
analyze the communication made by the user as an internal communication;
transmit the computer-readable file to a server, the server configured to perform backend services associated with a chat program; and
transmit, to the server, the value indicative of the selected animation asset.

8. The system of claim 6, wherein the program further causes the system to:
provide a chat interface associated with a chat program;
analyze the communication made by the user as a communication that is external to the chat program;
convert the mercemoji to a video file; and
transmit the video file to a server external to a server associated with the chat program.

9. The system of claim 6, wherein the program further causes the system to:
receive, from a server, a second audio filed associated with an incoming message, the server configured to perform back-end services associated with a chat program;
generate third audio markers by analyzing the second audio file;

generate a third set of control signals based on the third audio markers; and create a third mercemoji by manipulating controls of a third animation asset based on the third set of control signals in synchronization with a playback of the second audio file, wherein a displayed movement of the third animation asset is based on the manipulation of the controls of the third animation asset.

10. The system of claim 6, wherein when the processor causes the system to acquire a computer-readable file, the program causes the system to, acquire the computer-readable file from audio captured by a microphone coupled to the system.

11. The system of claim 6, wherein when the program causes the system to acquire a computer-readable file, the program causes the system to, acquire the computer-readable file from a pre-recorded audio file.

12. The system of claim 6, wherein when the program causes the system to acquire a computer-readable file, the program causes the system to, acquire the computer-readable file from a previously recorded video file.

13. One or more non-transitory computer-readable storage media storing instructions that when executed by one or more processors of a computing system, cause the computing system to perform operations comprising:
   execute a chat program that stores one or more animation assets;
   receive a file including audio;
   generate audio markers based on the file including audio;
   generate a set of control signals based on the audio markers;
   receive a value indicative of an animation asset, wherein the animation asset defines controls associated with portions of the selected animation asset, wherein a respective control is configured to cause a respective portion of the animation asset to move in response to a respective control signal;
   create a mercemoji by combining the animation asset, the file including the audio, and the set of control signals;
   input the mercemoji in a communication made by a user;
   receive a second file including audio;
   receive a second value indicative of a second animation asset;
   generate second audio markers by analyzing the second file including audio;
   generate a second set of control signals based on the second audio markers;
   create a second mercemoji by combining the second animation asset, the second file including audio and the second set of control signals.

14. The one or more non-transitory computer-readable storage media of claim 13:
   wherein the one or more animation assets include faces and hand gestures; and
   further wherein each of the one or more animation assets include controls responsive to control signals.

15. The one or more non-transitory computer-readable storage media of claim 13, wherein the instructions further cause the computing system to perform operations comprising:
   provide a chat interface associated with the chat program;
   analyze the communication made by the user as an internal communication;
   transmit the file including audio to a server, the server comprising executable software that cause a processor of the server to perform back-end services associated with the chat program; and
   transmit the value indicative of the animation asset.

16. The one or more non-transitory computer-readable storage media of claim 13, wherein the instructions further cause the computing system to perform operations comprising:
   convert the second mercemoji to a video format; and
   input the video format in a communication made by the user.

17. The one or more non-transitory computer-readable storage media of claim 13, wherein the instructions further cause the computing system to perform operations comprising:
   receive, from a server associated with the chat program, a third audio file and a third value indicative of a third animation asset; wherein the third audio file and the third value are associated with a prior created mercemoji;
   generate third audio markers by analyzing the third audio file;
generate a third set of control signals based on the third audio markers; and
   re-create the prior created mercemoji by manipulating controls of the third animation asset based on the third set of control signals in synchronization with a playback of the third audio file.

18. The one or more non-transitory computer-readable storage media of claim 13, wherein the instructions further cause the computing system to perform operations comprising:
   receive a request to send the mercemoji to a social network implemented on one or more servers;
   convert the mercemoji to a video file; and
   transmit the video file to a server of the social network.

19. The one or more non-transitory computer-readable storage media of claim 13, wherein when the computer system generates the set of control signals, the instructions cause the computing system to:
   assess an audio marker indicating a low tone, the low tone occurring in a discrete portion of the audio; and
   map the audio marker to a first control signal, the first control signal specifying a motion of a portion of the animation asset.

* * * * *